US 6,690,593 B2

(12) United States Patent
Kimura et al.

(10) Patent No.: US 6,690,593 B2
(45) Date of Patent: Feb. 10, 2004

(54) POWER INVERTER DESIGNED TO MINIMIZE SWITCHING LOSS

(75) Inventors: Tomonori Kimura, Kariya (JP); Masahito Mizukoshi, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/245,575

(22) Filed: Sep. 18, 2002

(65) Prior Publication Data

US 2003/0053323 A1 Mar. 20, 2003

(30) Foreign Application Priority Data

Sep. 20, 2001 (JP) ........................................ 2001-287029

(51) Int. Cl.[7] .................... H02M 3/24; H02M 7/5387; H02P 5/34
(52) U.S. Cl. ........................ 363/98; 363/132; 318/801
(58) Field of Search ............................. 363/17, 97, 98, 363/131, 132, 56.01, 56.02, 56.03, 56.05; 318/798–802, 806–812, 814

(56) References Cited

U.S. PATENT DOCUMENTS

| | | | | |
|---|---|---|---|---|
| 5,631,819 A | * | 5/1997 | Masaki et al. | 363/132 |
| 5,650,708 A | | 7/1997 | Sawada et al. | |
| 5,757,636 A | * | 5/1998 | Fletcher | 363/98 |
| 6,121,736 A | * | 9/2000 | Narazaki et al. | 318/254 |
| 6,324,085 B2 | | 11/2001 | Kimura et al. | |
| 6,362,593 B1 | * | 3/2002 | Lee | 318/801 |

* cited by examiner

*Primary Examiner*—Matthew V. Nguyen
(74) *Attorney, Agent, or Firm*—Posz & Bethards, PLC

(57) ABSTRACT

A power inverter for a polyphase load such as an AC motor is provided which is designed to minimize an on-off switching loss of transistors installed in the inverter. The inverter works to disenable switching operations of the transistors for each phase in a first cycle during which a corresponding output current is high in level and partially disenable the switching operations in a second cycle following the first cycle during which the corresponding output current is middle in level.

18 Claims, 19 Drawing Sheets

FIG. 2(a) carrier 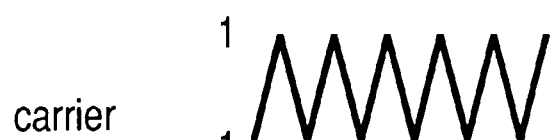
FIG. 2(b) ck1 
FIG. 2(c) ck2 

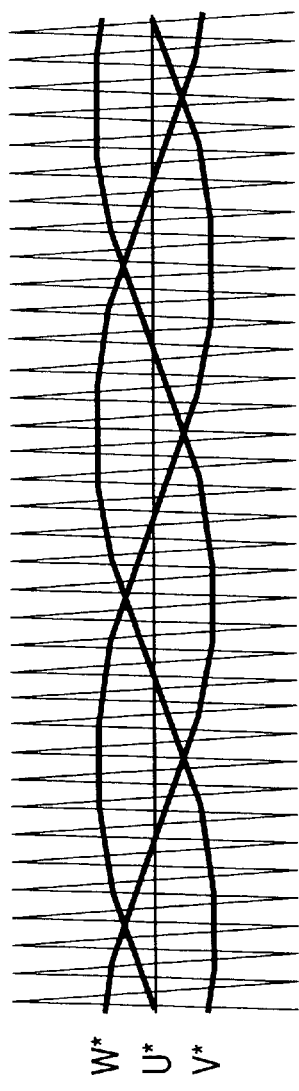
FIG. 8(a)
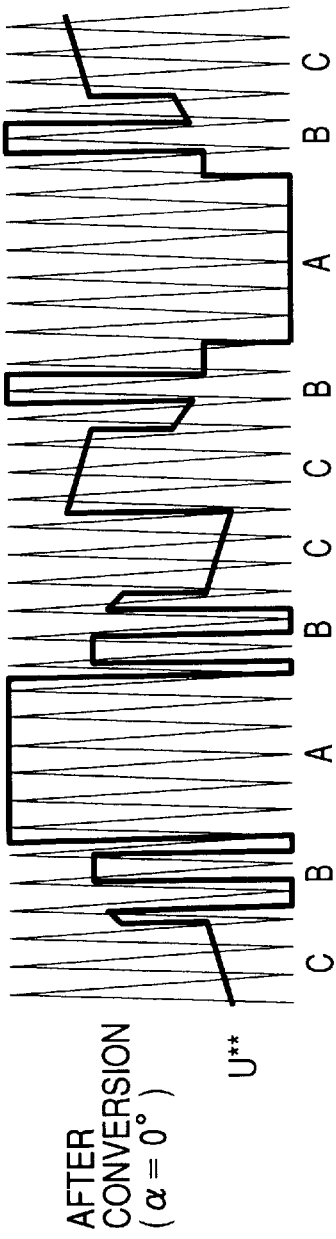
FIG. 8(b) AFTER CONVERSION ($\alpha = 0°$)
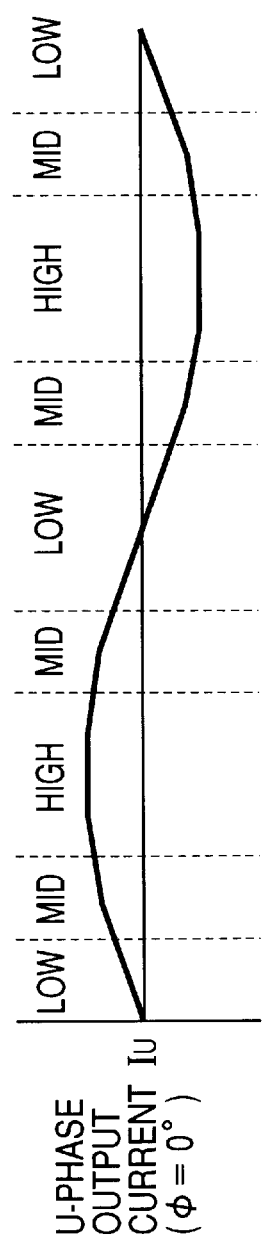
FIG. 8(c) U-PHASE OUTPUT CURRENT Iu ($\phi = 0°$)

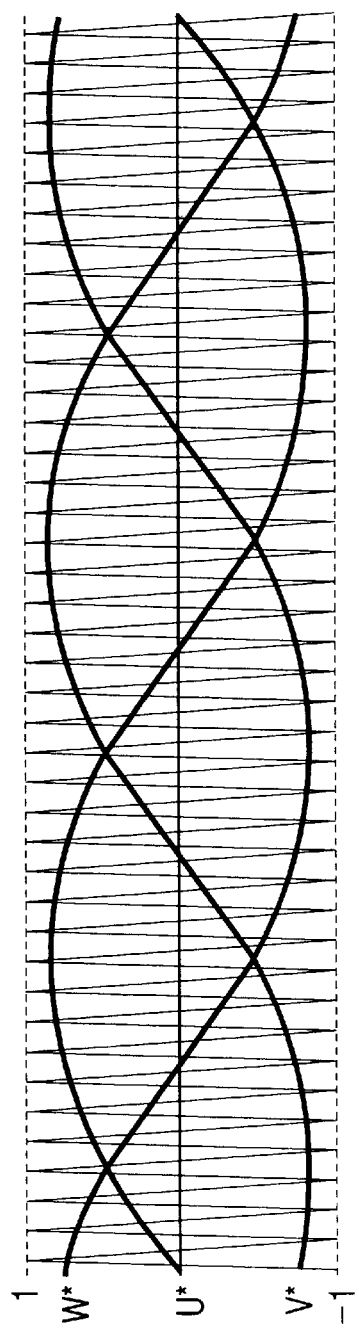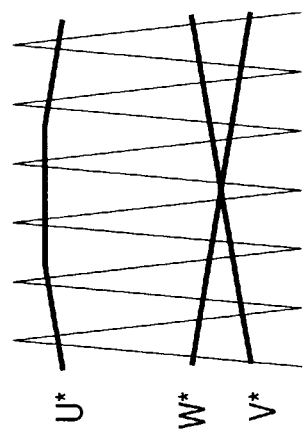
FIG. 15(a)
FIG. 15(b)

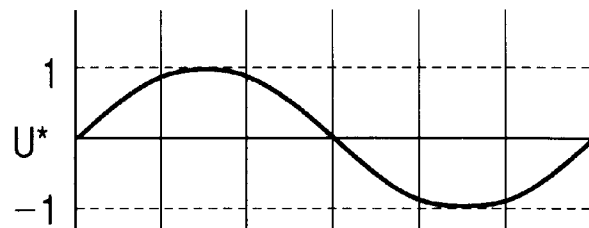
FIG. 17(a) U*
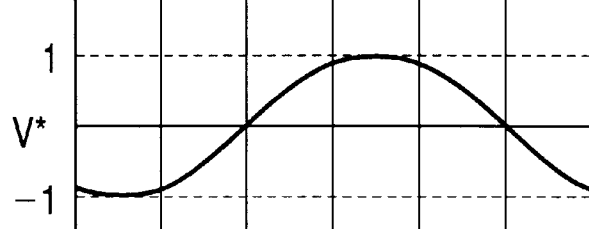
FIG. 17(b) V*
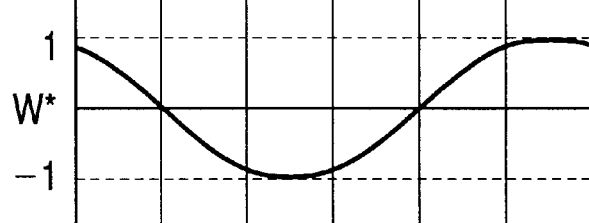
FIG. 17(c) W*
FIG. 17(d) U**
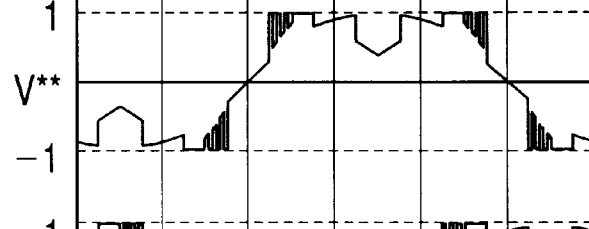
FIG. 17(e) V**
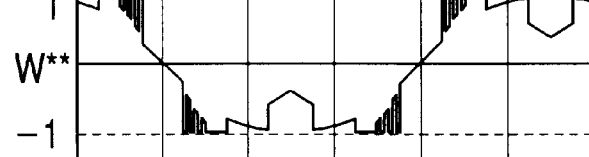
FIG. 17(f) W**

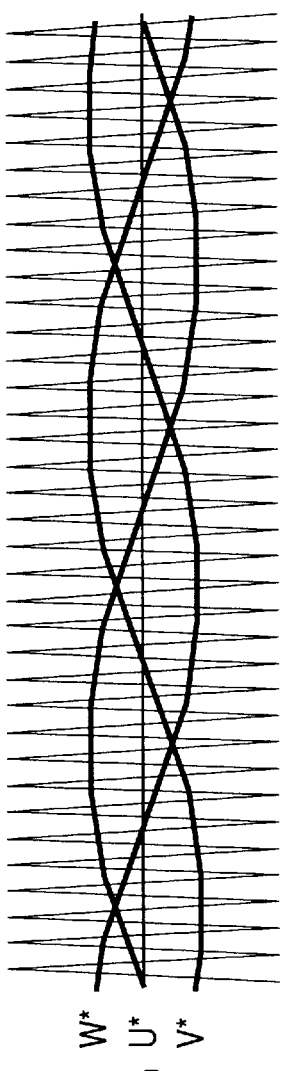
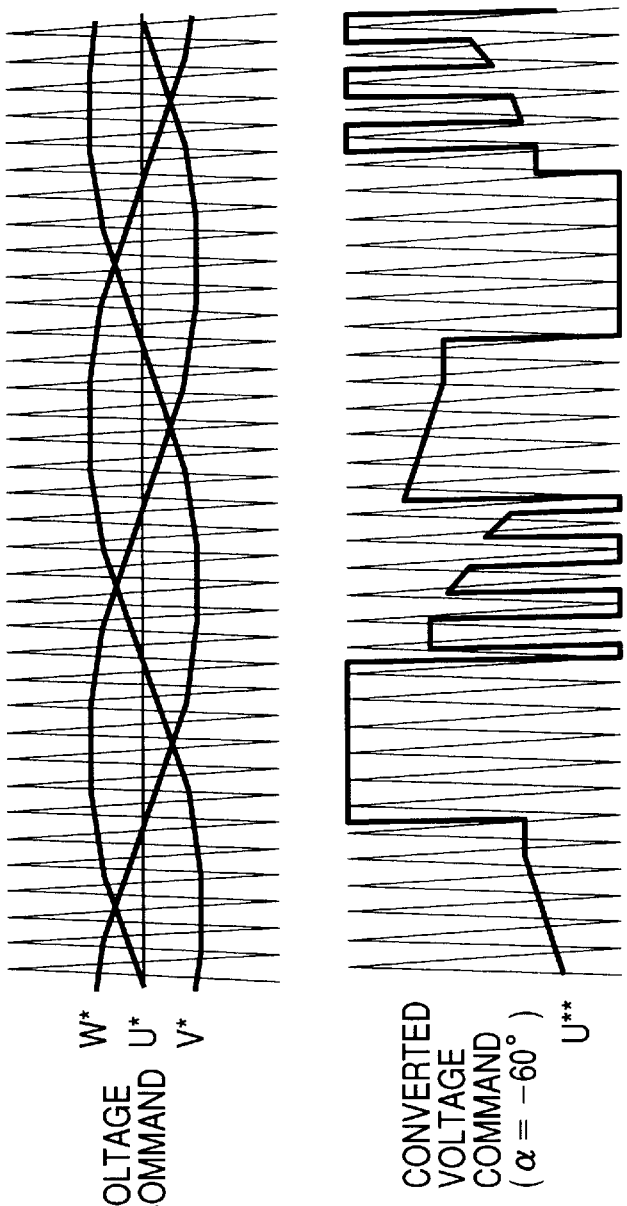
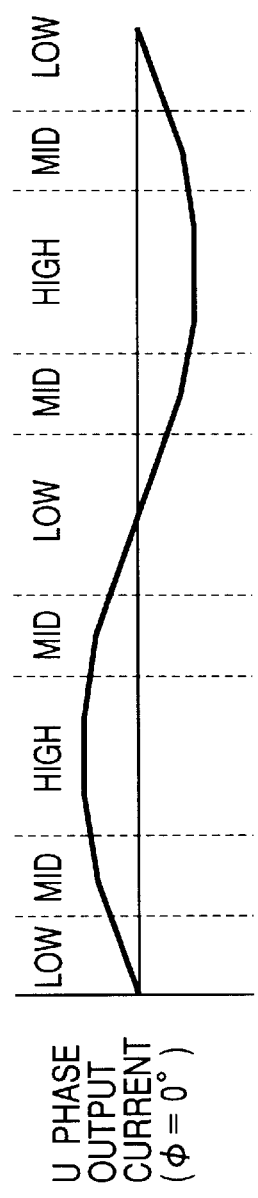
FIG. 19(a) VOLTAGE COMMAND W* U* V*
FIG. 19(b) CONVERTED VOLTAGE COMMAND ($\alpha = -60°$) U**
FIG. 19(c) U PHASE OUTPUT CURRENT ($\phi = 0°$)

POWER INVERTER DESIGNED TO MINIMIZE SWITCHING LOSS

BACKGROUND OF THE INVENTION

1. Technical Field of the Invention

The present invention relates generally to a power inverter working to drive a polyphase load, and more particularly to such a power inverter designed to minimize a switching loss.

2. Background Art

FIG. 13 shows an example of an electrical structure of a typical inverter working to drive a polyphase AC motor used in driving an electric vehicle. The inverter main circuit 7 is made up of six IGBTs 1 to 6 which are joined in the form of a three-phase bridged connection. The inverter main circuit 7 has DC buses 7a and 7b connected to a positive terminal and a negative terminal of the drive battery 8, respectively, and output terminals 7u, 7v, and 7w connected to respective phase windings (not shown) of a three-phase AC motor such as a synchronous motor, an induction motor, or a brushless motor. The freewheeling diodes D1 to D6 are connected between a collector and an emitter of the IGBTs 1 to 6 electrically in a reverse parallel.

The command generator 10 includes a ROM storing therein data on voltage commands U*, V*, and W* and is designed, for example, to measure a zero-cross point of an output of a current sensor (not shown) disposed between each of the output terminals 7u to 7w of the inverter main circuit 7 and one of windings of the polyphase AC motor 9, measure a phase θ of a rotor of the AC motor 9 using an output of a rotary encoder or a resolver, read the voltage commands U*, V*, and W* for three phases (will also be referred to as U, V, and W-phases below) out of the ROM based on the phase θ to output them to the PWM-waveform generator 11. Note that each of the voltage commands U*, V*, and W* is a function of amplitude of a sine wave, for example.

FIG. 14 shows an internal structure of the PWM-waveform generator 11. The voltage commands U*, V*, and W* are inputted from the command generator 10 to non-inverting inputs of comparators 12a, 12c, and 12e and to inverting inputs of comparators 12b, 12d, and 12f. The carrier wave generator 13 produces a carrier wave in the form of a triangular wave for pulse width modulation (PWM) and outputs it to the inverting inputs of the comparators 12a, 12c, and 12e and the non-inverting inputs of the comparators 12b, 12d, and 12f, respectively.

In a case where the voltage commands U*, V*, and W* and the carrier wave are provided in a digital form, each of the comparators 12a to 12f is implemented by a magnitude comparator. Alternatively, in a case where they are all provided in an analog form, each of the comparators 12a to 12f is implemented by an analog comparator.

When the voltage commands U*, V*, and W* are higher in level than the carrier wave, the comparators 12a, 12c, and 12e output signals C1, C3, and C5 of a high level to the dead time generator 14. Simultaneously, the comparators 12b, 12d, and 12f output signals C2, C4, and C6 that are reversed in level to signals C1, C3, and C5 to the dead time generator 14, respectively. The dead time generator 14 works to correct on-off timing of the signals C1, C2, C3, C4, C5, and C6 so as to produce a dead time during which ones of the IGBTs 1 to 6 that are on a negative and a positive side on one arm are both in an off-state in order to prevent the both are in an on-state simultaneously.

The dead time generator 14 produces gate signals G1' to G6' which are inputted to gates of the IGBTs 1 to 6 as gate signals G1 to G6, respectively, through the driver 15 made by, for example, a photocoupler.

Considering, as an example, the U-phase, when the voltage command U* is higher in level than the carrier wave, the IGBT 1 is turned on, while the IGBT 2 is turned off, so that a potential at a positive side of a DC power supply (i.e., the battery 8) is outputted from the inverter main circuit 7. Conversely, when the voltage command U* is lower in level than the carrier wave, the IGBT 1 is turned off, while the IGBT 2 is turned on, so that a potential at a negative side of the DC power supply is outputted from the inverter main circuit 7. With these operations, the voltage on the positive side of the battery 8 is outputted during a time period that is proportional to the voltage command U* in a cycle of the carrier wave.

If each of the voltage commands U*, V*, and W* is, as shown in FIGS. 15(a) and 15(b), in the form of a sine wave, the voltage is outputted from the inverter main circuit 7 in the form of a sine wave into which the width of pulses is modulated, thereby outputting the current in the form of substantially a sine wave. As the frequency of the carrier wave is increased, it becomes possible to have the output current approach an ideal sine wave. Increasing the frequency of the carrier wave to 15 kHz or more results in a great decrease in magnetic noise of the motor 9. To this end, the inverter main circuit 7 uses the IGBTs 1 to 6 which are capable of being switched on and off at high speed.

The inverter main circuit 7, however, has a drawback in that operating the inverter main circuit 7 on a great power causes a great amount of heat to be generated due to a loss of power conversion, thus requiring cooling it using water, for example, which forms the obstruction to miniaturization and reduction in manufacturing cost of the system. Half of the loss of power conversion is attributed to an on-off switching loss of the IGBTs 1 to 6. The switching loss usually increases with an increase in switching frequency, thus encountering a difficulty in using the IGBTs 1 to 6 at high switching frequencies.

In order to avoid such a problem, Japanese Patent Application No. 11-369662 (U.S. Pat. No. 6,324,085 B2 assigned to the same assignee as that of this application) teaches a system designed to disenable switching operations of transistors of the inverter main circuit temporarily for a given period of time so as to minimize distortion of waveform of an output current for decreasing the switching loss.

Specifically, during a period of time X, as shown in FIG. 16(b), in which any two of the voltage commands U*, V*, and W* are, as shown in FIGS. 16(a) to 17(f), nearly equal to each other, the above system works to fix the two of the voltage commands U*, V*, and W* at a maximum or a minimum value to stop the switching operation. The period of time X contains a first cycle (b, d, f) in which he two of the voltage commands U*, V*, and W* are fixed at the maximum or minimum value and a second cycle (a, c, e, g) in which only one of the voltage commands U*, V*, and W* is fixed at the maximum or minimum value which are provided alternately, thereby resulting in a further decrease in distortion of the waveform of the output current as well as reducing the switching loss.

The above system, however, determines the switching disenabling period of time regardless of the level of the output current, so that the switching, as shown in FIGS. 18(a) and 18(b), may be performed during a period of time in which the amount of current flowing to a load is relatively great, thus resulting in a difficulty in reducing the switching loss sufficiently.

SUMMARY OF THE INVENTION

It is therefore a principal object of the invention to avoid the disadvantages of the prior art.

It is another object of the invention to provide a power inverter for a polyphase load designed to minimize an on-off switching loss of switching elements installed in the inverter.

According to one aspect of the invention, there is provided a power inverter designed to output power to a polyphase load. The power inverter comprises: (a) an inverter main circuit working to apply phase voltages to the polyphase load through switching elements; (b) a voltage command outputting circuit outputting first voltage commands for respective phases, each of the first voltage commands varying between a maximum and a minimum level; (c) a voltage command converter converting the first voltage commands outputted by the voltage command outputting circuit into second voltage commands in a first and a second conversion cycle which are provided alternately; and (d) a switching control signal outputting circuit working to pulse-width modulate a carrier wave as functions of the respective second voltage commands to output switching control signals for the respective phases to control switching operations of the switching elements of the inverter main circuit.

The voltage command converter works to convert two of the first voltage commands into the second voltage commands that are equal to one of the maximum and minimum levels in the first conversion cycle and also convert one of the two of the first voltage commands into the second voltage command that is equal to one of the maximum and minimum levels in the second conversion cycle. If the one of the first voltage commands as being converted into the second voltage command that is equal to the one of the maximum and minimum levels both in the first and second conversion cycles is defined as an A-phase voltage command, the A-phase voltage command is selected as one of two of the first voltage commands showing the maximum and minimum levels within the first and second conversion cycles which is greater in absolute value of a corresponding current outputted to the polyphase load. If the other of the two of the first voltage commands as being converted into the second voltage commands that is equal to the one of the maximum and minimum level only in the first conversion cycle is defined as a B-phase voltage command, the B-phase voltage command is selected as one of the first voltage commands which is greater in absolute value of a corresponding current outputted to the polyphase load next to the A-phase voltage command.

Specifically, the A-phase voltage command has either of the maximum and minimum levels over the first and second conversion cycles, thus disenabling corresponding one or ones of the switching elements completely over the first and second conversion cycles. The B-phase voltage command has either of the maximum and minimum levels only in the first conversion cycle, thereby resulting in a decrease in number of switching operations of the switching elements as compared with the A-phase voltage command. The A-phase is, as described above, selected as one of two of the first voltage commands showing the maximum and minimum levels within the first and second conversion cycles which is greater in absolute value of a corresponding current outputted to the polyphase load. The B-phase voltage command is, as described above, selected as one of the first voltage commands which is greater in absolute value of a corresponding current outputted to the polyphase load next to the A-phase voltage command. If the other first voltage command allowing the switching elements to be switched on and off over the first and second conversion cycles is defined as a C-phase voltage command, the C-phase voltage command is provided for a period of time during which an absolute value of a corresponding current outputted from the inverter main circuit is the lowest. In other words, the switching operations for each phase are performed as many times as possible for a period of time during which an absolute value of a corresponding current output from the inverter main circuit is the lowest, thus resulting in a decrease in switching loss of the switching elements.

In the preferred mode of the invention, the voltage command converter determines one of the first voltage commands selected as each of the A-phase voltage command and the B-phase voltage command as a function of a phase difference between the first voltage command and the current outputted to the polyphase load.

When one of the second voltage commands into which the B-phase voltage command is converted in the second conversion cycle lies out of a range of the maximum level to the minimum level, one of the second voltage commands into which the B-phase voltage command is converted in the first conversion cycle being corrected to a value reversed in polarity, while the second voltage command into which the B-phase voltage command is converted in the second conversion cycle is corrected to a value that is equal to an excess of the second voltage command over the range of the maximum to minimum level. This minimizes the distortion of waveform of the current output from the inverter main circuit.

The number of phases of the polyphase load may be three.

The polyphase load may be an AC motor.

According to the second aspect of the invention, there is provided a power inverter outputting power to a polyphase load which comprises: (a) an inverter main circuit working to apply phase voltages to the polyphase load through switching elements; (b) a voltage command outputting circuit outputting first voltage commands for respective phases, each of the first voltage commands varying between a maximum and a minimum level; (c) a voltage command converter converting the first voltage commands outputted by the voltage command outputting circuit into second voltage commands in a first and a second conversion cycle which are provided alternately; and (d) a switching control signal outputting circuit working to pulse-width modulate a carrier wave as functions of the respective second voltage commands to output switching control signals for the respective phases to control switching operations of the switching elements of the inverter main circuit.

The voltage command converter converts two of the first voltage commands into the second voltage commands that are identical with one of the maximum and minimum levels in the first conversion cycle and also converts one of the two of the first voltage commands into the second voltage command that is identical with one of the maximum and minimum levels in the second conversion cycle. Assuming that one of the two of the first voltage commands which is converted into the second voltage command that is equal to the one of the maximum and minimum levels only in the first conversion cycle is defined as a third voltage command, when the second voltage command into which the third voltage command is converted in the second conversion cycle lies out of a range of the maximum level to the minimum level, the second voltage command into which the third voltage command being converted in the first conversion cycle is corrected to a value reversed in polarity, while the second voltage command into which the third voltage command is converted in the second conversion cycle is corrected to a value that is equal to an excess of the second voltage command over the range of the maximum to minimum level. This minimizes the distortion of waveform of the current output from the inverter main circuit.

In the preferred mode of the invention, if the other of the two of the first voltage commands as being converted into the second voltage commands that is equal to the one of the maximum and minimum level both in the first conversion cycle and the second conversion cycle is defined as a fourth voltage command, the voltage command converter changes one of the first voltage commands selected as each of the third voltage command and the fourth voltage command as a function of a given parameter.

The number of phases of the polyphase load may be three.

The polyphase load may be an AC motor.

According to the third aspect of the invention, there is provided a method of outputting power to a polyphase load from an inverter main circuit which comprises the steps of: (a) outputting first voltage commands for respective phases each of which varies between a maximum and a minimum level; (b) converting the first voltage commands outputted by the voltage command outputting circuit into second voltage commands in a first and a second conversion cycle which are provided alternately, in the first conversion cycle, two of the first voltage commands being converted into the second voltage commands that are equal to one of the maximum and minimum levels, in the second conversion cycle, one of the two of the first voltage commands being converted into the second voltage command that is equal to one of the maximum and minimum levels, if the one of the first voltage commands as being converted into the second voltage command that is equal to the one of the maximum and minimum levels both in the first and second conversion cycles is defined as an A-phase voltage command, the A-phase voltage command being selected as one of two of the first voltage commands showing the maximum and minimum levels within the first and second conversion cycles which is greater in absolute value of a corresponding current outputted to the polyphase load, if the other of the two of the first voltage commands as being converted into the second voltage commands that is equal to the one of the maximum and minimum level only in the first conversion cycle is defined as a B-phase voltage command, the B-phase voltage command being selected as one of the first voltage commands which is greater in absolute value of a corresponding current outputted to the polyphase load next to the A-phase voltage command; and (c) pulse-width modulating a carrier wave as functions of the respective second voltage commands to output switching control signals for the respective phases to control switching operations of switching elements of the inverter main circuit for driving the polyphse load.

In the preferred mode of the invention, one of the first voltage commands selected as each of the A-phase voltage command and the B-phase voltage command being determined as a function of a phase difference between the first voltage command and the current outputted to the polyphase load.

When one of the second voltage commands into which the B-phase voltage command is converted in the second conversion cycle lies out of a range of the maximum level to the minimum level, one of the second voltage commands into which the B-phase voltage command is converted in the first conversion cycle is corrected to a value reversed in polarity, while the second voltage command into which the B-phase voltage command is converted in the second conversion cycle is corrected to a value that is equal to an excess of the second voltage command over the range of the maximum to minimum level.

The number of phases of the polyphase load may be three.

The polyphase load may be an AC motor.

According to the fourth aspect of the invention, there is provided a method of outputting power to a polyphase load from an inverter main circuit which comprises the steps of: (a) outputting first voltage commands for respective phases each of which varies between a maximum and a minimum level; (b) converting the first voltage commands outputted by the voltage command outputting circuit into second voltage commands in a first and a second conversion cycle which are provided alternately, in the first conversion cycle, two of the first voltage commands being converted into the second voltage commands that are identical with one of the maximum and minimum levels, in the second conversion cycle, one of the two of the first voltage commands being converted into the second voltage command that is identical with one of the maximum and minimum levels, assuming that one of the two of the first voltage commands which is converted into the second voltage command that is equal to the one of the maximum and minimum levels only in the first conversion cycle is defined as a third voltage command, when the second voltage command into which the third voltage command is converted in the second conversion cycle lies out of a range of the maximum level to the minimum level, the second voltage command into which the third voltage command being converted in the first conversion cycle being corrected to a value reversed in polarity, the second voltage command into which the third voltage command being converted in the second conversion cycle being corrected to a value that is equal to an excess of the second voltage command over the range of the maximum to minimum level; and (c) pulse-width modulating a carrier wave as functions of the respective second voltage commands to output switching control signals for the respective phases to control switching operations of switching elements of the inverter main circuit for driving the polyphase load.

In the preferred mode of the invention, if the other of the two of the first voltage commands as being converted into the second voltage commands that is equal to the one of the maximum and minimum level both in the first conversion cycle and the second conversion cycle is defined as a fourth voltage command, one of the first voltage commands selected as each of the third voltage command and the fourth voltage command being changed as a function of a given parameter.

The number of phases of the polyphase load may be three.

The polyphase load may be an AC motor.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) shows a carrier wave produced in a PWM-waveform generator of the inverter of FIG. 1;

Figure 1:
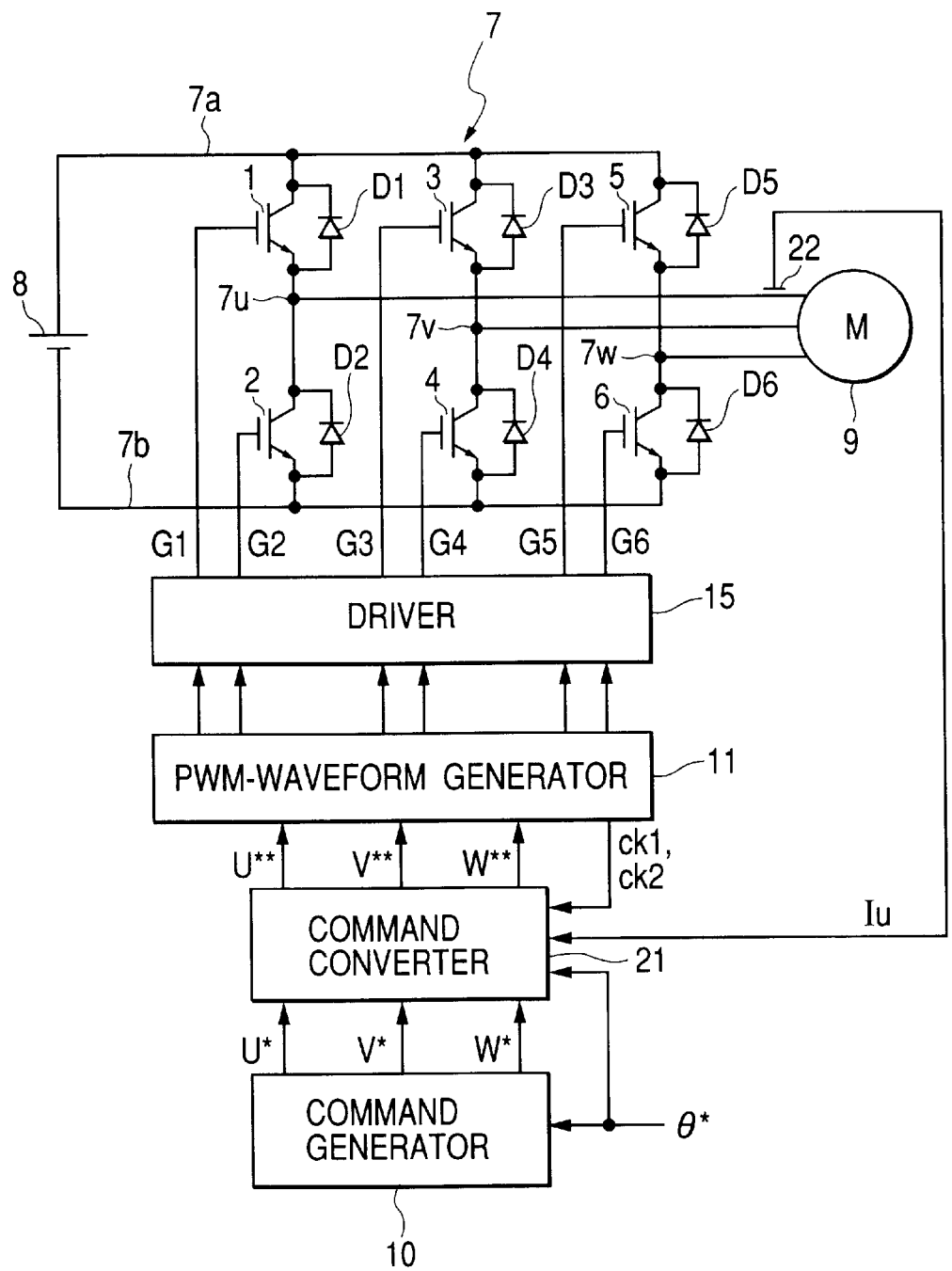
FIG. 1 is a block diagram which shows an inverter according to the invention which works to supply power to a polyphase AC motor.
Figure 7A:
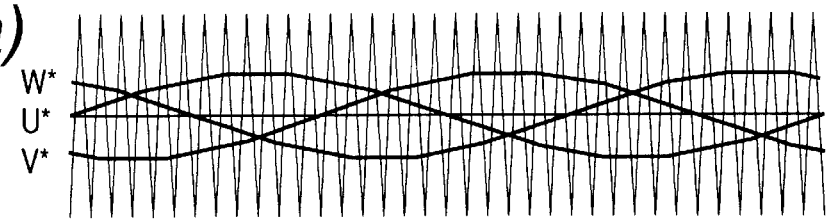
Figure 7B:
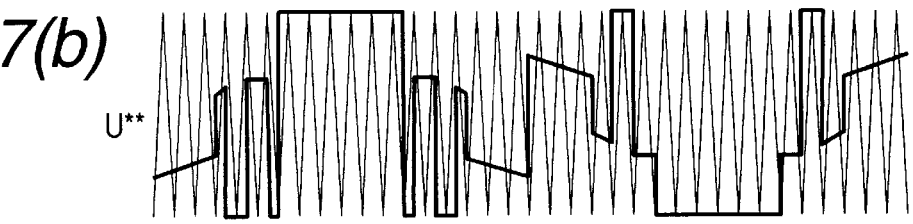
Figure 7C:
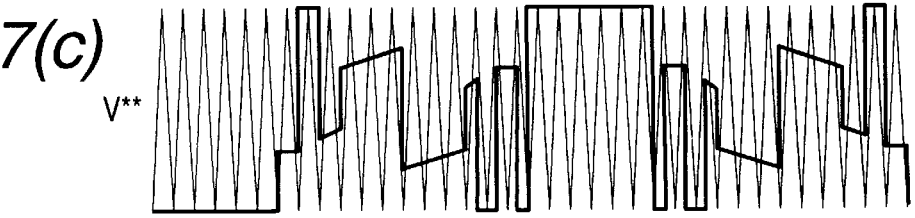
Figure 7D:
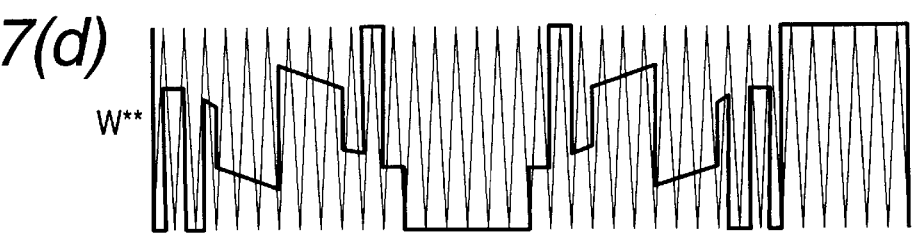
Figure 9:
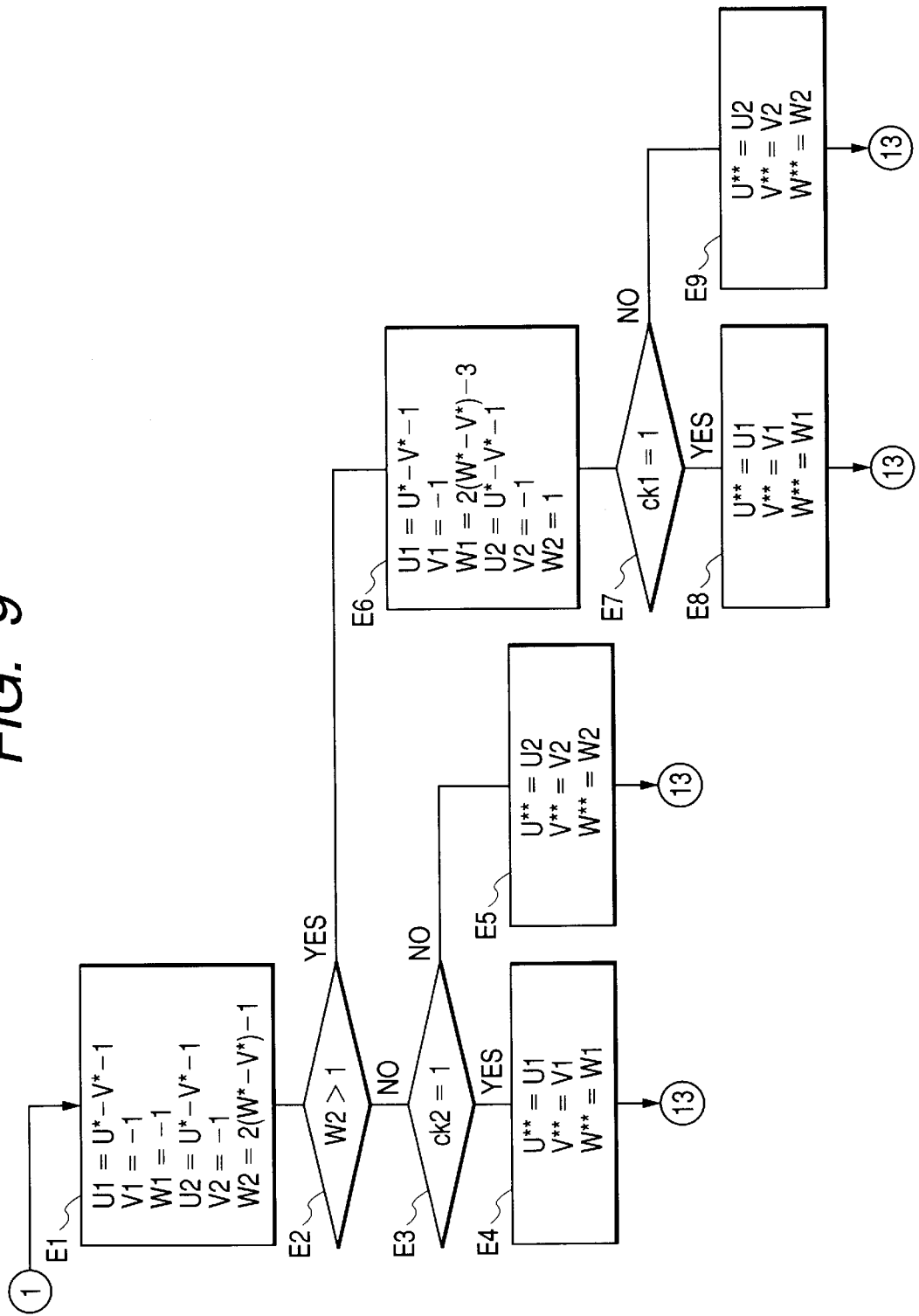
Figure 10:
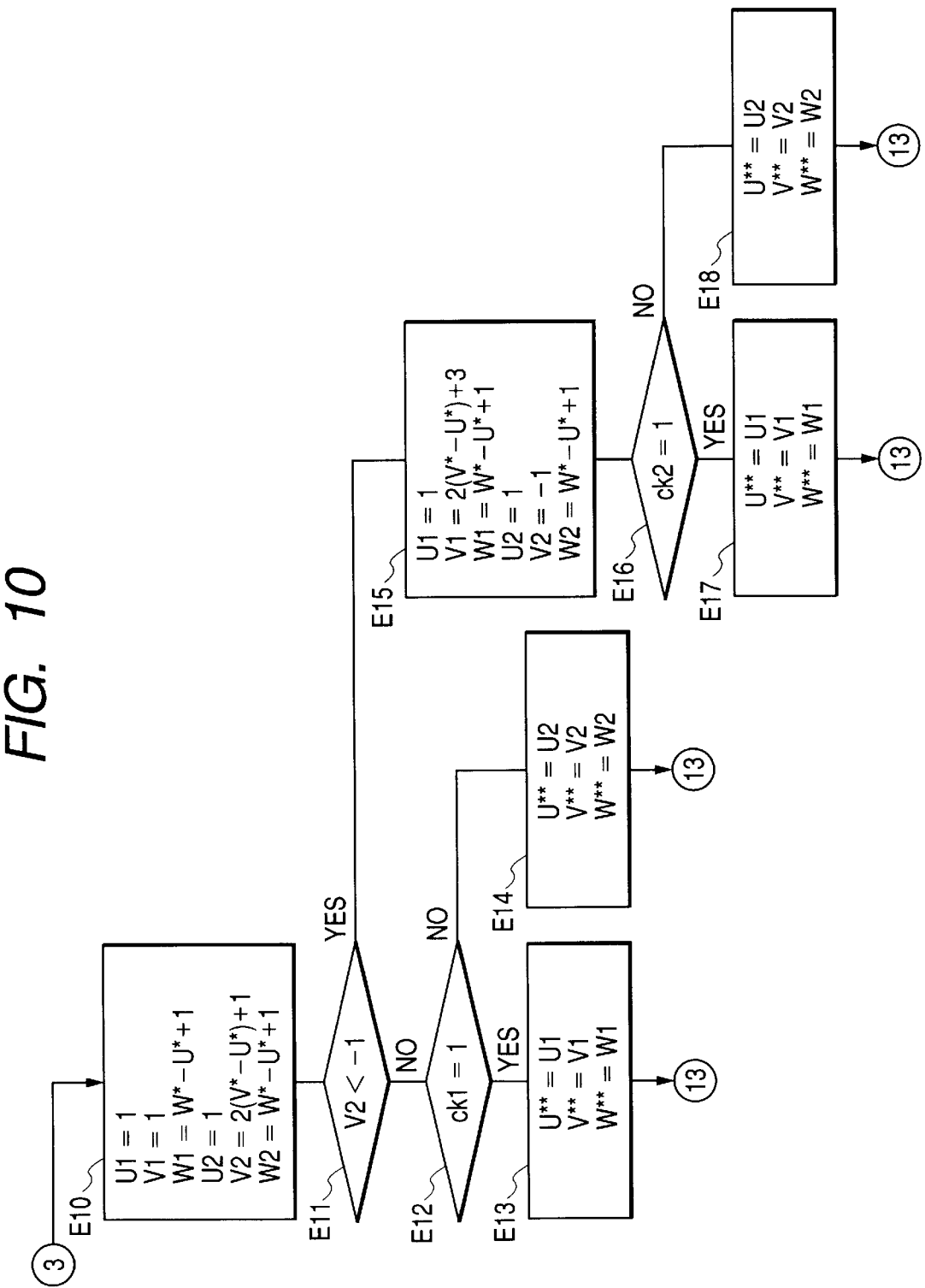
Figure 11:
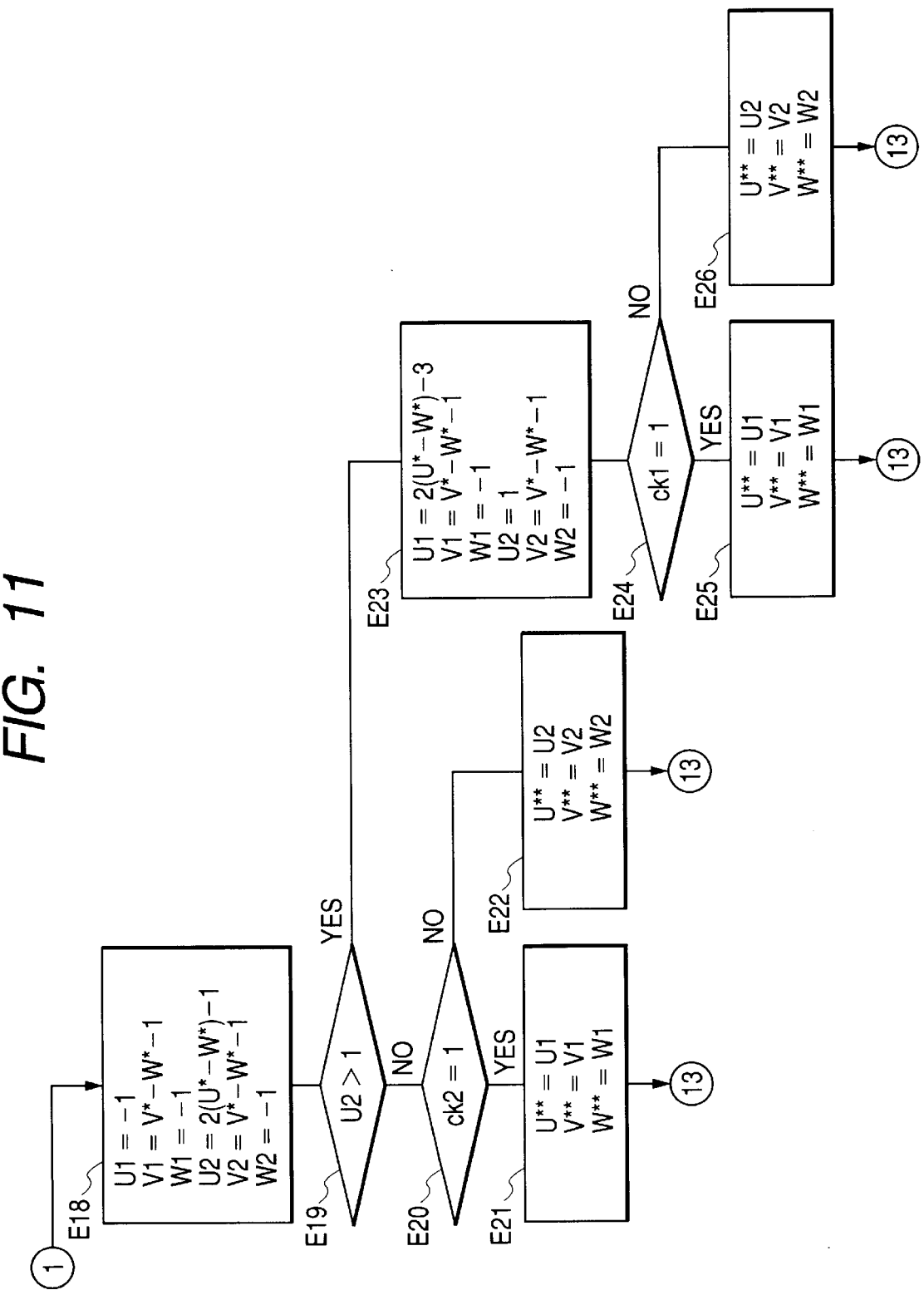
Figure 12A:
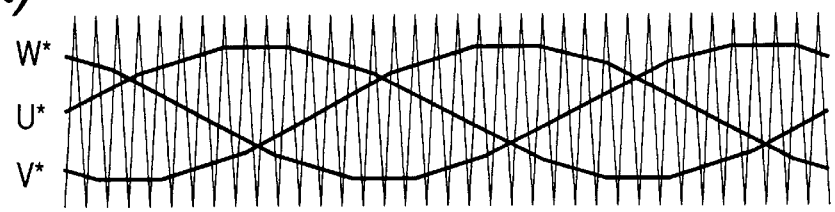
Figure 12B:
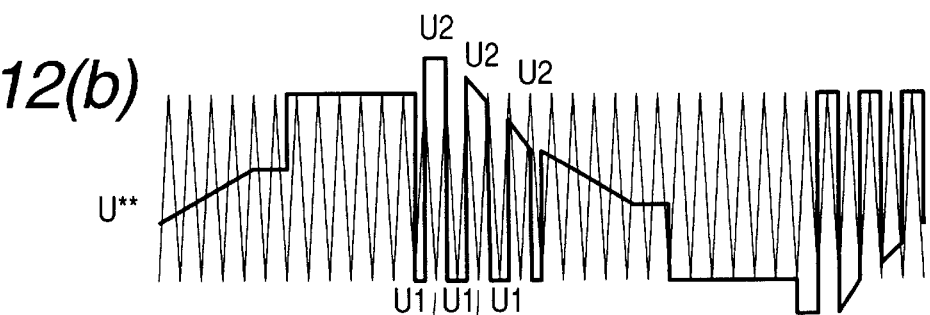
Figure 12C:
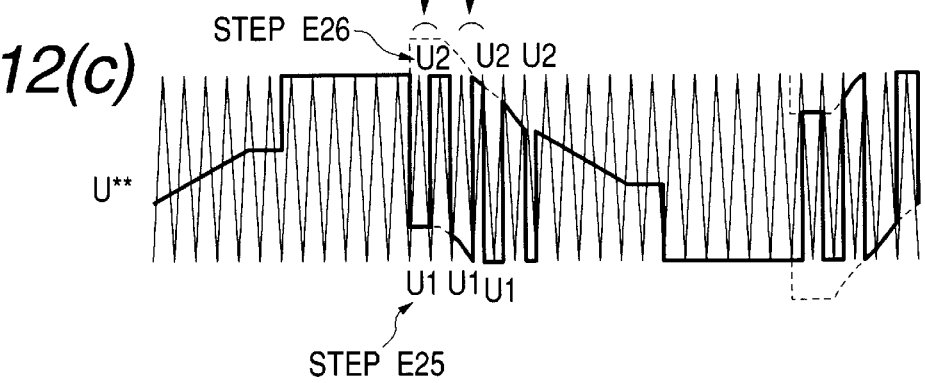
Figure 13:
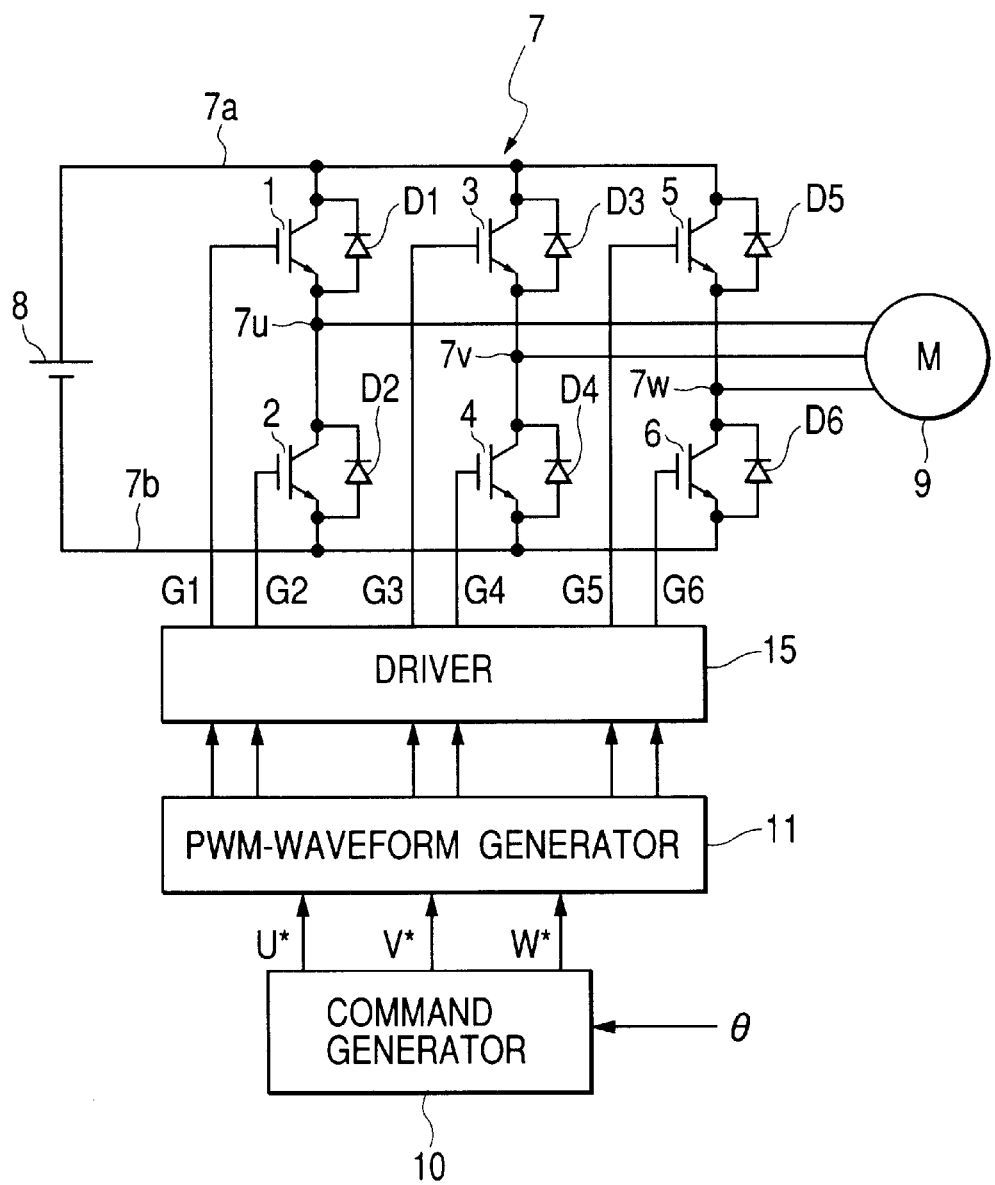
Figure 14:
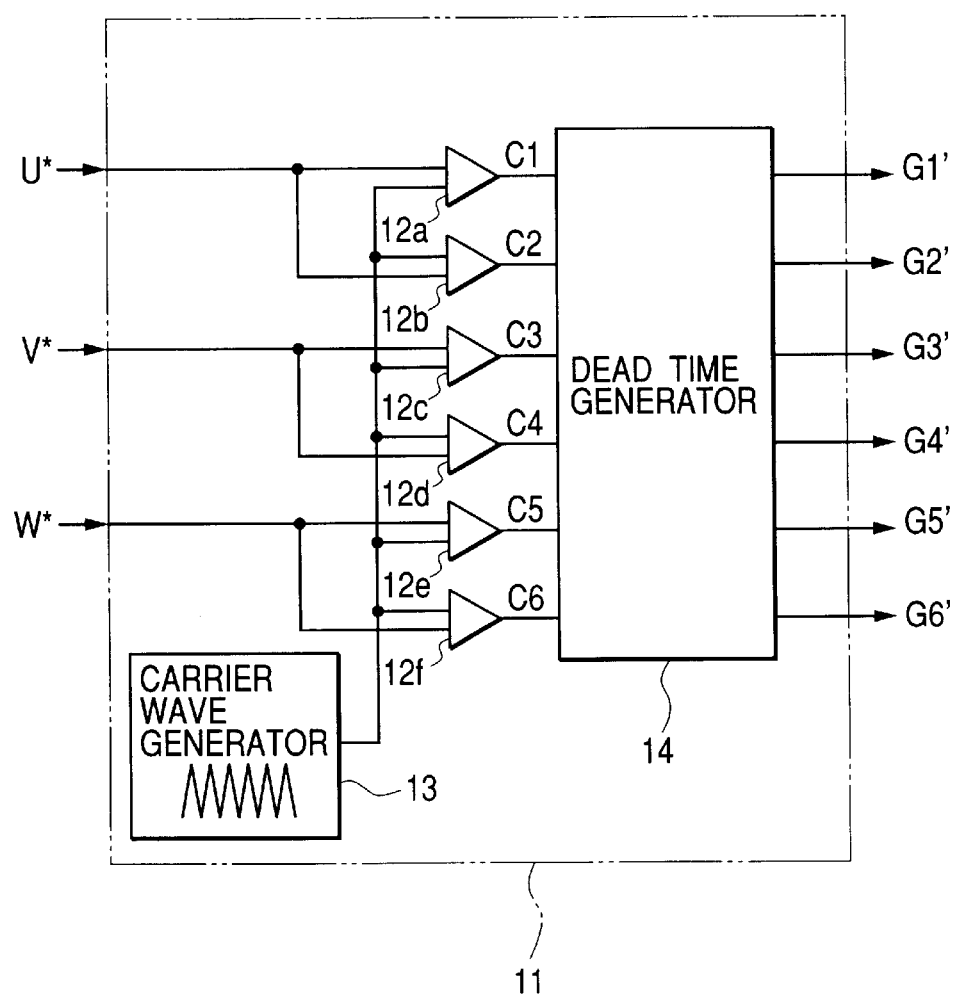
Figure 16A:
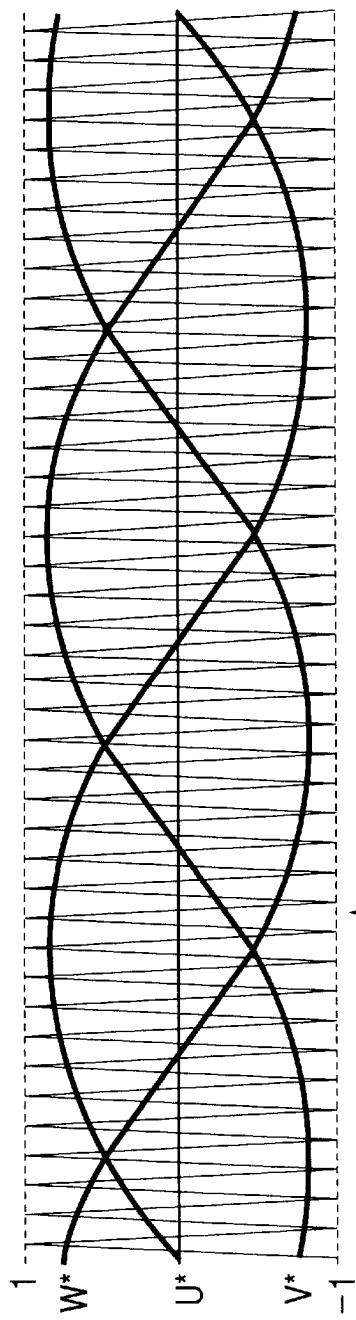
Figure 16C:
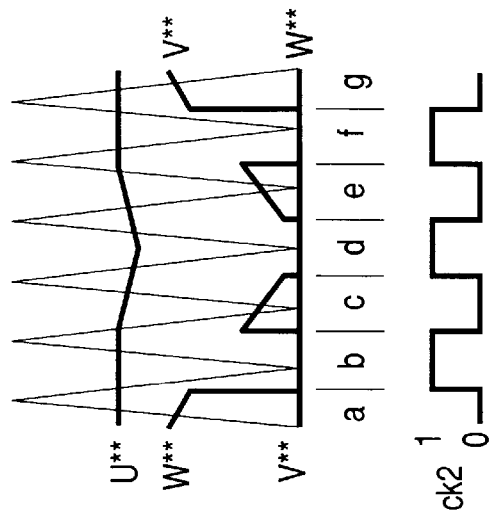
Figure 16B:
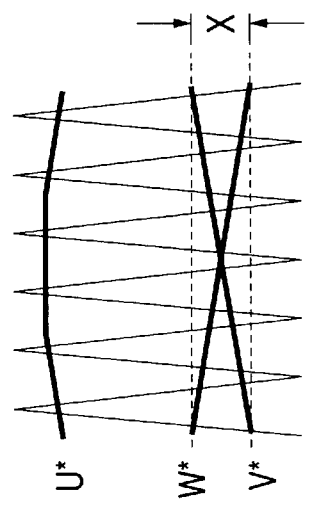
Figure 18A:
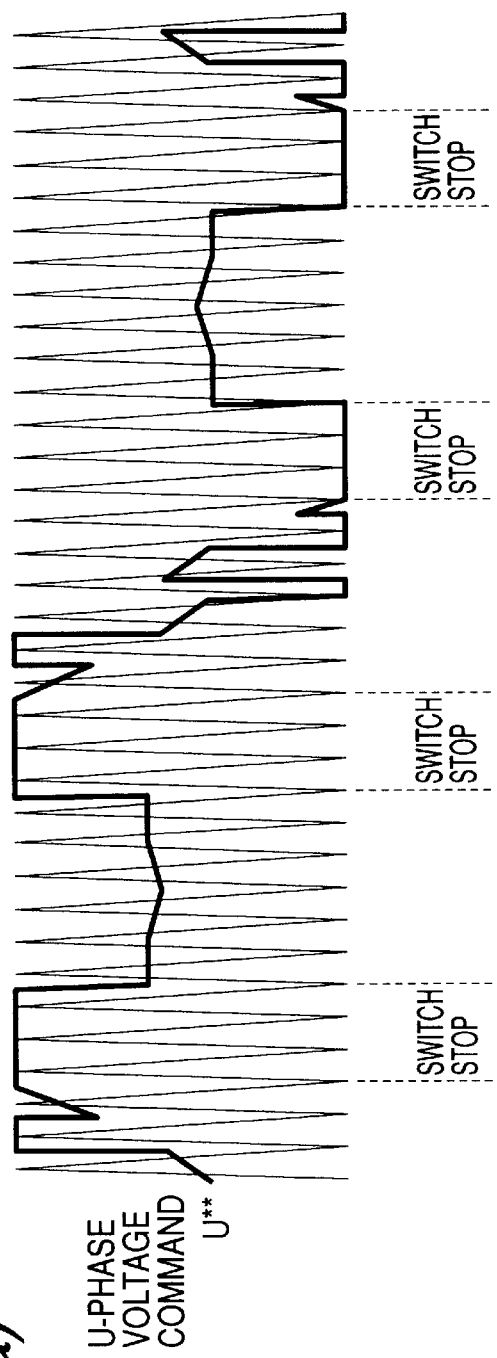
Figure 18B:

FIGS. 2(b) and 2(c) show clock signals ck1 and ck2 generated by a PWM-waveform generator of the inverter of FIG. 1;

FIGS. 3, 4, 5, and 6 show a flowchart of a program performed in a command converter of the inverter of FIG. 1 which converts voltage commands for minimizing a switching loss of the inverter of FIG. 1;

FIG. 7(a) is an illustration which shows waveforms of U-phase, V-phase, and W-phase voltage commands used in switching on and off transistors of the inverter of FIG. 1;

FIG. 7(b) is an illustration which shows a U-phase voltage command into which the U-phase voltage command of FIG. 7(a) is converted;

FIG. 7(c) is an illustration which shows a V-phase voltage command into which the V-phase voltage command of FIG. 7(a) is converted;

FIG. 7(d) is an illustration which shows a W-phase voltage command into which the W-phase voltage command of FIG. 7(a) is converted;

FIG. 8(a) is an illustration which shows waveforms of U-phase, V-phase, and W-phase voltage commands used in switching on and off transistors of the inverter of FIG. 1;

FIG. 8(b) shows a U-phase voltage command into which the U-phase voltage command of FIG. 8(a) is converted;

FIG. 8(c) is an illustration which shows waveform of a U-phase output current;

FIGS. 9, 10, and 11 show a flowchart of a program to be performed in the second embodiment of the invention;

FIG. 12(a) is an illustration which shows waveforms of U-phase, V-phase, and W-phase voltage commands used in the second embodiment of the invention;

FIG. 12(b) shows a U-phase voltage command into which the U-phase voltage command of FIG. 12(a) is converted;

FIG. 12(c) shows the U-phase voltage command, as illustrated in FIG. 12(b), after being corrected through logical steps in FIG. 11;

FIG. 13 is a block diagram which shows an example of a conventional inverter which drives a three-phase AC motor;

FIG. 14 is a block diagram which shows an internal structure of a PWM-waveform generator installed in the inverter of FIG. 13;

FIG. 15(a) is an illustration which shows waveforms of voltage commands inputted to the PWM-waveform generator of FIG. 14;

FIG. 15(b) is an enlarged view of FIG. 15(a);

FIG. 16(a) is an illustration which shows waveforms of voltage commands used in a conventional inverter as taught in U.S. Pat. No. 6,324,085 B2 assigned to the same assignee as that of this application;

FIG. 16(b) is an enlarged view of FIG. 16(a);

FIG. 16(c) is an illustration which shows voltage commands into which the voltage commands, as illustrated in FIG. 16(a), are converted in synchronization with a clock ck2;

FIGS. 17(a), 17(b), and 17(c) show the voltage commands, as illustrated in FIG. 16(a), respectively;

FIGS. 17(d), 17(e), and 17(f) show the voltage commands into which the voltage commands, as illustrated in FIGS. 17(a), 17(b), and 17(c), are converted, respectively;

FIG. 18(a) is an enlarged view which shows the U-phase voltage command, as illustrated in FIG. 17(d);

FIG. 18(b) is an illustration which show a U-phase output current;

FIG. 19(a) is an illustration which shows waveforms of voltage commands used in a comparative example of an inverter;

FIG. 19(b) shows a U-phase voltage command into which the U-phase voltage command of FIG. 19(a) is converted; and FIG. 19(c) is an illustration which shows waveform of a U-phase output current.

DESCRIPTION OF THE PREFERRED EMBODIMENTS

Referring to the drawings, wherein like reference numbers refer to like parts in several views, particularly to FIG. 1, there is shown an inverter according to the first embodiment of the invention which is designed to drive a three-phase AC motor 9 which may be employed in driving an electric vehicle.

The inverter includes the inverter main circuit 7, the battery 8, the driver 15, the PWM-waveform generator 11, the command converter 21, and the command generator 10. The same reference numbers as employed in FIGS. 13 and 14 refer to the same parts, and explanation of structure and operation thereof in detail will be omitted here.

The command converter 21 is disposed between the command generator 10 and the PWM-waveform generator 11. The command converter 21 is implemented by, for example, a digital signal processor along with the command generator 10 and the PWM-waveform generator 11 and works to perform a sequence of logical steps or program, as shown in FIGS. 3 to 6 to correct or convert the voltage commands U*, V*, and W* into voltage commands U, V, and W which are, in turn, outputted to the PWM-waveform generator 11. The PWM-waveform generator 11 has the same structure as the one in FIG. 14 and works to pulse-width modulate the carrier wave produced by the carrier generator 13 using the voltage commands U, V, and W to provide the gate signals G1 to G6 to the IGBTs 1 to 6. The PWM-waveform generator 11 also works to provide clock signals ck1 and ck2 to the command converter 21.

The clock signal ck1 has, as shown in FIG. 2(b), a cycle that is twice a cycle of the carrier wave, as shown in FIG. 2(a), produced in the PWM-waveform generator 11 and rises synchronously at the instant the level of the carrier wave reaches −1. The clock signal ck2 rises and falls 90° in phase after the clock signal ck1. The command converter 21 works to monitor the levels of the clock signals ck1 and ck2 for determining the time the voltage commands U*, V*, and W* should be converted. Specifically, when one of the voltage commands U*, V*, and W* having the greatest amplitude of a sine wave is on the positive side, the level (i.e., 1 or 0) of the clock signal ck1 is used to determine which of a first and a second conversion cycle should be entered, which will be described later in detail. Similarly, when one of the voltage commands U*, V*, and W* having the greatest amplitude of the sine wave is on the negative side, the level of the clock signal ck2 is used to determine which of the first and second conversion cycles should be entered.

To each of the command generator 10 and the command converter 21, a reference phase θ* is inputted. The reference phase θ* is provided for determining the phases of the voltage commands U*, V*, and W* and produced in a reference phase generator (not shown) as a function of a phase θ of a rotor of the AC motor 9. The reference phase θ* contains a component advanced or retarded as a function of an operating condition of the AC motor 9. The phase θ may alternatively be used as the reference phase θ* as it is.

The inverter main circuit 7 consists of six IGBTs 1 to 6 which are joined in the form of a three-phase bridged connection. The inverter main circuit 7 has DC buses 7a and 7b connected to a positive terminal and a negative terminal of the battery 8, respectively, and U-phase, V-phase, and W-phase output terminals 7u, 7v, and 7w connected to respective phase windings (not shown) of the AC motor. The freewheeling diodes D1 to D6 are connected between a collector and an emitter of the IGBTs 1 to 6 electrically in a reverse parallel. Disposed between the U-phase output terminal of the inverter main circuit 7 and the motor 9 is the current detector 22 which may be implemented by a current transformer. The current detector 22 measures the current flowing through the U-phase winding of the AC motor 9 and outputs a current signal Iu indicative thereof to the command converter 21.

FIGS. 3 to 6 show, as described above, the program to be executed by the command converter 21.

After entering the program, the routine proceeds to step D1 wherein the voltage commands U*, V*, and W* and the reference phase θ* are read in the command converter 21. Steps D2 to D13 determine whether the reference phase θ* meets given conditions or not in twelve sections (will also be referred to as cycle sections below) defined by dividing one cycle of the voltage commands U*, V*, and W* from 0 to 2π by π/6 in phase, respectively. A given phase shift a is added to each cycle section. The phase shift a serves to cancel a phase difference between the voltage commands U*, V*, and W* and the output currents (will also be referred to as a voltage-to-current phase difference θVI) that may be calculated by finding a current phase θI from the current signal Iu produced by the current detector 23 and determining a difference between the current phase θI and the reference phase θ*. Note that if the power factor=1, α may be set to zero (0).

Figure 4:
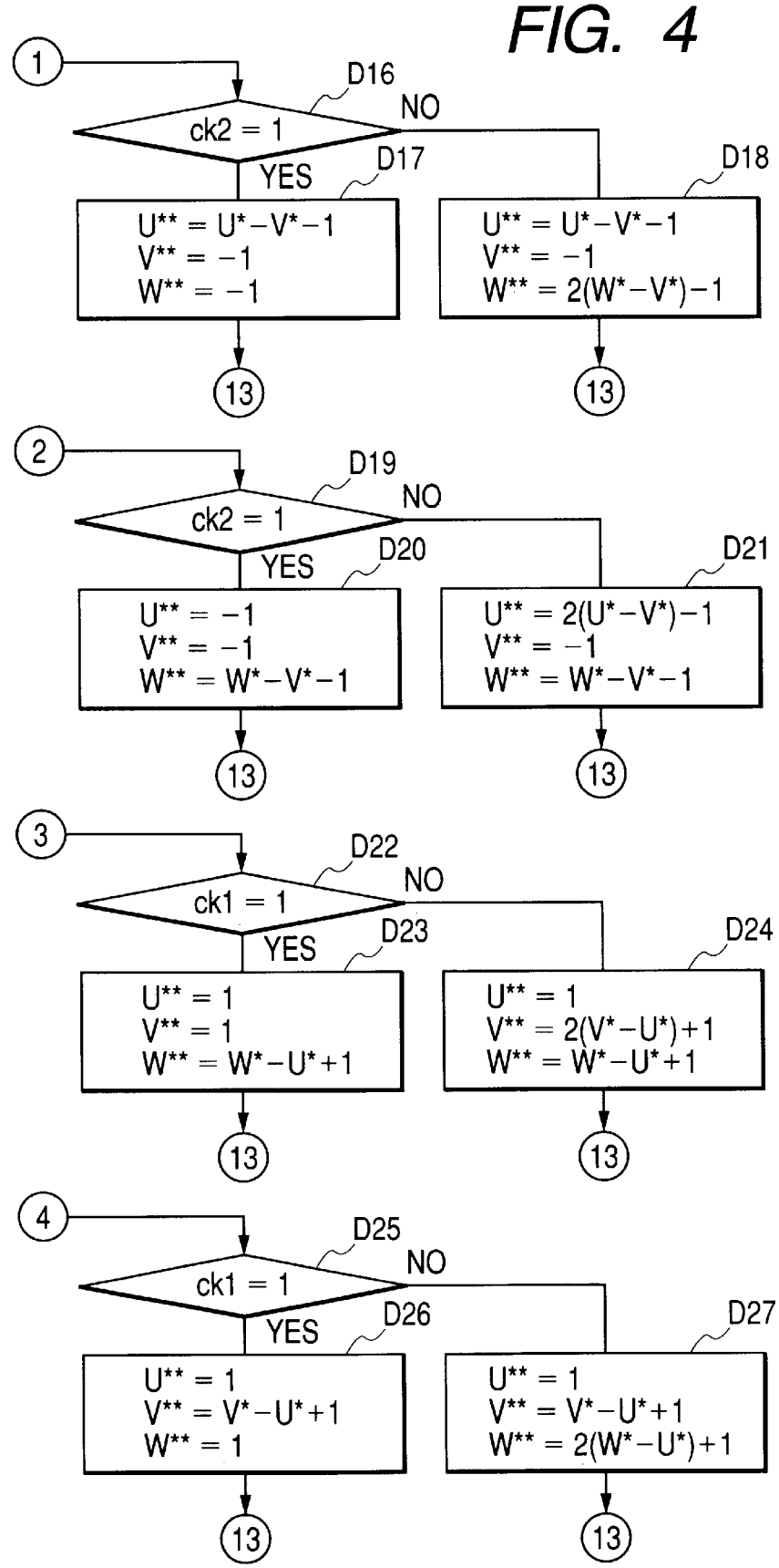

In step D2, it is determined whether the reference phase θ* lies within a range of 0+α to π/6+α or not. If a YES answer is obtained, then the routine proceeds to step D16, as shown in FIG. 4, wherein it is determined whether the level of the clock signal ck2 is one (1) or not. If a YES answer is obtained meaning that the level of the clock signal ck2 is one (1) indicating that the first conversion cycle should be entered, then the routine proceeds to step D17 wherein the voltage commands U*, V*, and W* are corrected or converted into the voltage commands U, V, and W** defined as follows:
U**=U*−V*−1
V**=−1
W**=−1

Alternatively, if a NO answer is obtained in step D16 meaning that the level of the clock signal ck2 is zero (0) indicating that the second conversion cycle should be entered, then the routine proceeds to step D18 wherein the voltage commands U, V, and W** are defined as follows:
U**=U*−V*−1
V**=−1
W**=2(W*−V*)−1

Specifically, the voltage command V* for the V-phase is converted into a minimum value of −1 (i.e., a lower limit of an amplitude range of the voltage command V*) both in the first and second conversion cycles, which will be referred to as an A-phase voltage command below. The voltage command W* for the W-phase is converted into the minimum value in the first conversion cycle, but not in the second conversion cycle, which will be referred to as a B-phase voltage command below. The voltage command U* for the U-phase is provided to switch the IGBTs 1 and 2 on and off cyclically both in the first and second conversion cycles, which will be referred to as a C-phase voltage command below.

After step D17 or D18, the routine proceeds to step D15 wherein the voltage commands U, V, and W are outputted to the PWM-waveform generator 11**.

If a NO answer is obtained in step D2, then the routine proceeds to step D3 wherein it is determined whether the reference phase θ* lies within a range of π/6+α to π/3+α or not. If a YES answer is obtained, then the routine proceeds to step D19, as shown in FIG. 4, wherein it is determined whether the level of the clock signal ck2 is one (1) or not. If a YES answer is obtained meaning that the first conversion cycle should be entered, then the routine proceeds to step D20 wherein the voltage commands U, V, and W** are defined as follows:
U**=−1
V**=−1
W**=W*−V*−1

Alternatively, if a NO answer is obtained in step D19 meaning that the second conversion cycle should be provided, then the routine proceeds to step D21 wherein the voltage commands U, V, and W** are defined as follows:
U**=2(U*−V*)−1
V**=−1
W**=W*−V*−1

Specifically, the voltage command V* is provided as the A-phase voltage command. The voltage command U* is provided as the B-phase voltage command. The voltage command W* is provided as the C-phase voltage command. In other words, the B-phase voltage command and the C-phase voltage command are reversed to steps D17 and D18. After step D20 or D21, the routine proceeds to step D15.

If a NO answer is obtained in step D3, then the routine proceeds to step D4 wherein it is determined whether the reference phase θ* lies within a range of π/3+α to π/2+α or not. If a YES answer is obtained, then the routine proceeds to step D22, as shown in FIG. 4, wherein it is determined whether the level of the clock signal ck1 is one (1) or not. If a YES answer is obtained meaning that the first conversion cycle should be entered, then the routine proceeds to step D23 wherein the voltage commands U, V, and W** are defined as follows:
U**=1
V**=1
W**=W*−U*+1

Alternatively, if a NO answer is obtained in step D22 meaning that the second conversion cycle should be entered, then the routine proceeds to step D24 wherein the voltage commands U, V, and W** are defined as follows:
U**=1
V**2(V*−U*)+1
W**=W*−U*+1

Specifically, the voltage command U* is provided as the A-phase voltage command. The voltage command V* is provided as the B-phase voltage command. The voltage command W* is provided as the C-phase voltage command. After step D23 or D24, the routine proceeds to step D15.

If a NO answer is obtained in step D4, then the routine proceeds to step D5 wherein it is determined whether the reference phase $\theta^*$ lies within a range of $\pi/2+\alpha$ to $2\pi/3+\alpha$ or not. If a YES answer is obtained, then the routine proceeds to step D25, as shown in FIG. 4, wherein it is determined whether the level of the clock signal ck1 is one (1) or not. If a YES answer is obtained meaning that the first conversion cycle should be entered, then the routine proceeds to step D26 wherein the voltage commands U, V, and W** are defined as follows:

U**=1
V**=V*−U*+1
W**=1

Alternatively, if a NO answer is obtained in step D25 meaning that the second conversion cycle should be entered, then the routine proceeds to step D27 wherein the voltage commands U, V, and W** are defined as follows:

U**=1
V**=V*−U*+1
W**=2(W*−U*)+1

Specifically, the voltage command U* is provided as the A-phase voltage command. The voltage command V* is provided as the C-phase voltage command. The voltage command W* is provided as the B-phase voltage command. After step D26 or D27, the routine proceeds to step D15.

Figure 5:
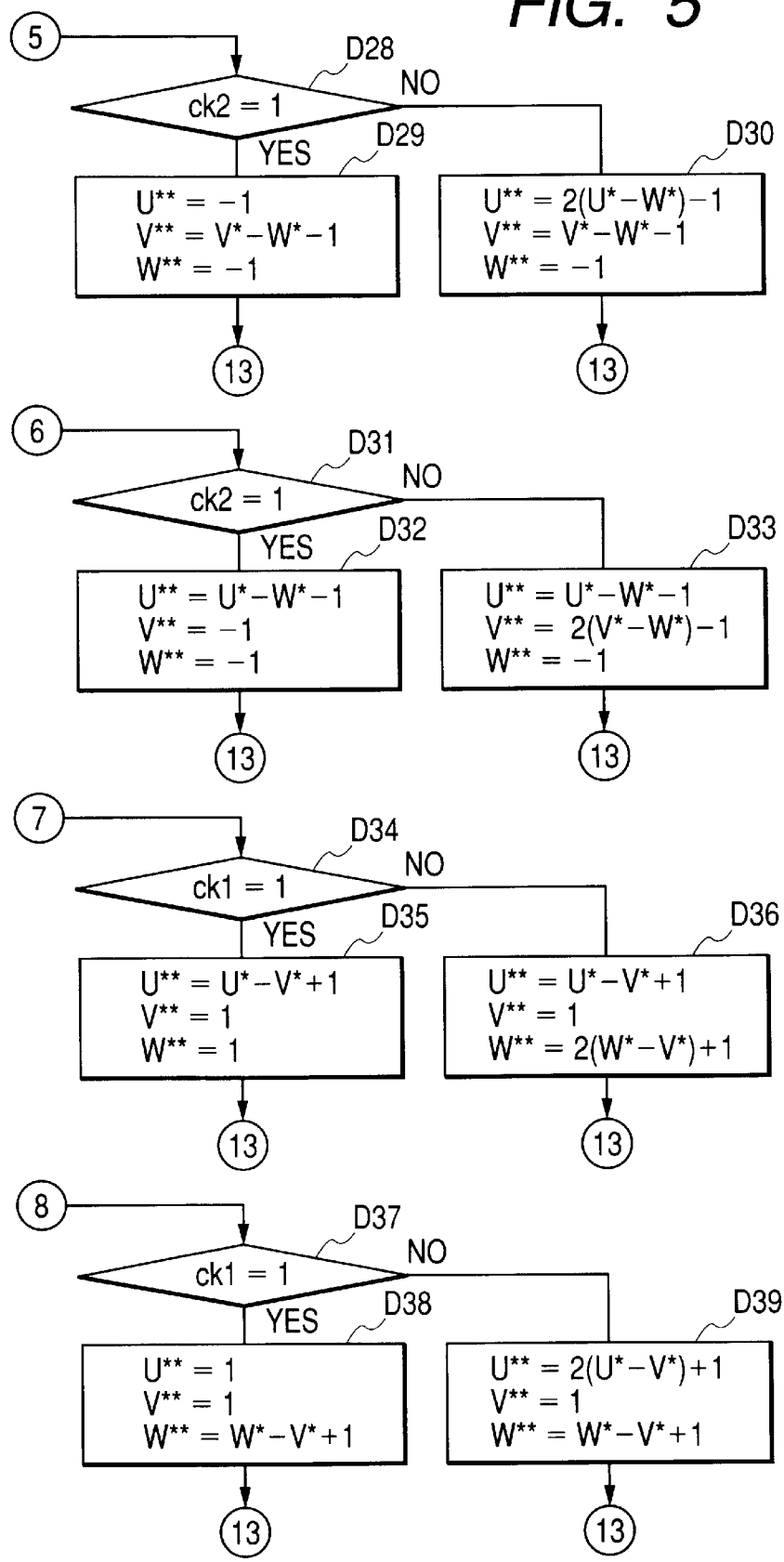
Figure 6:
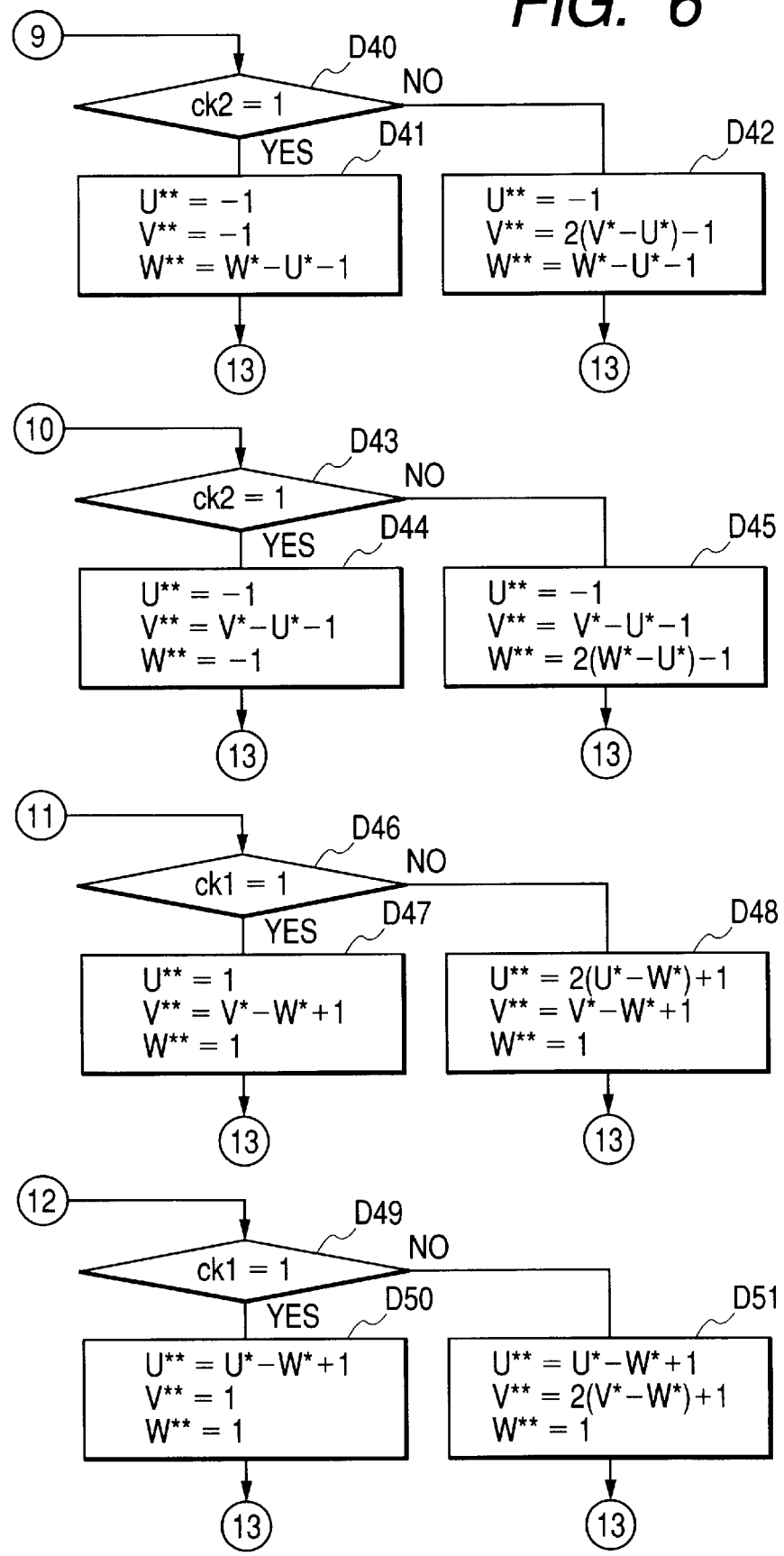

Steps D6 to D13 determine whether the reference phase $\theta^*$ lies within ranges of $2\pi/3+\alpha$ to $5\pi/6+\alpha$, $5\pi/6+\alpha$ to $\pi+\alpha$, $\pi+\alpha$ to $7\pi/6+\alpha$, $7\pi/6+\alpha$ to $4\pi/3+\alpha$, $4\pi/3+\alpha$ to $3\pi/2+\alpha$, $3\pi/2+\alpha$ to $5\pi/3+\alpha$, $5\pi/3+\alpha$ to $11\pi/6+\alpha$, and $11\pi/6+\alpha$ to $2\pi+\alpha$ or not, respectively. If YES answers are obtained in steps D6 to D9, then the routine proceeds to steps D28 to D37, as shown in FIG. 5, respectively. If YES answers are obtained in steps D10 to D13, then the routine proceeds to steps D40 to D49, as shown in FIG. 6, respectively. Details of operations in steps D29 to D51 will be clear from the drawings, and explanation thereof will be omitted here.

In summary, the A-, B-, and C-phase voltage commands to which the U-, V-, and W-phase voltage commands U, V, and W are set are shifted in sequence every second cycle section (i.e., steps D2, D4, D6, . . . ) in this order. In each of following cycle sections (steps D3, D5, D7, . . . ), one of the voltage commands U, V, and W which is set to the A-phase voltage command remains unchanged, while two of them set to the B- and C-phase voltage commands are reversed to a preceding one of the cycle sections.

FIG. 7($a$) illustrates the voltage commands U*, V*, and W* produced by the command generator 10. FIGS. 7($b$), 7($c$), and 7($d$) illustrate the voltage commands U, V, and W** into which the voltage commands U*, V*, and W* are converted by the command converter 21 and which are inputted to the PWM-waveform generator 11. FIG. 8($a$) illustrates waveforms of the voltage commands U*, V*, and W*. FIG. 8($b$) illustrates, as an example, the waveform of the voltage commands U for the U-phase. FIG. 8($c$) illustrate the U-phase output current Iu of the inverter main circuit 7 which is produced as a function of the voltage command U. In the illustrated case, the power factor is one (1). If half a cycle of the U-phase output current Iu is, as clearly shown in FIG. 8($c$), broken down into the following amplitude ranges, 0~$\pi/6$: low level range $\pi/6$~$\pi/3$: middle level range $\pi/3$~$2\pi/3$: high level range $2\pi/3$~$5\pi/6$: middle level range $5\pi/6$~$\pi$: low level range it will cause the converted voltage command U** be set, as can be seen from FIG. 8($b$), to the C-phase voltage command in the low level range, the B-phase voltage command in the middle level range, and the A-phase voltage command in the high level range. Specifically, within the low level range including the zero-cross point of the waveform of the current Iu, the switching operations of the IGBTs 1 to 6 are performed in the inverter main circuit 7. Within the high level range including either of a maximum and a minimum level of the amplitude of the current Iu, the switching operations are disenabled completely, so that corresponding ones of the IGBTs 1 to 6 are held on or off. Within the middle level range where the level of the amplitude of the current Iu is between the high and the low level ranges, the number of the switching operations is intermediate between the high and the low level ranges, that is, the switching operations are disenabled partially.

FIGS. 19($a$) and 19($b$) show the voltage commands U*, V*, and W* and the waveform of the voltage commands U** into which the voltage command U* is converted by a comparative voltage command converter designed to stop the switching operations of the transistors IGBTs for one of the three phases in the inverter main circuit 7 for a given period of time in which a current output for the one of the three phases, as shown in FIG. 19($c$), is high in order to reduce the switching loss of the inverter main circuit 7. Comparison between the case, as illustrated in FIGS. 19($a$) to 19($c$), and this embodiment, as illustrated in FIGS. 8($a$) to 8($c$), shows that the C-phase voltage command provided within the middle level range of $\pi/6$~$\pi/3$ in the comparative voltage command converter is changed to the B-phase voltage command in this embodiment, and the B-phase voltage command provided within the low level range of $5\pi/6$~$\pi$ in the comparative voltage command converter is changed to the C-phase voltage command in this embodiment. Specifically, the command converter 21 of this embodiment carries out the switching operations of a number equivalent to that disenabled by the comparative voltage command converter in a range where the output current of the inverter main circuit 7 is lower in level.

As apparent from the above discussion, the command converter 21 of this embodiment is designed to convert one of two of the voltage commands U*, V*, and W* showing the maximum and minimum value within the first and second conversion cycles that is greater in absolute value of a corresponding current outputted from the inverter main circuit 7, into the A-phase voltage command (i.e., −1 or +1 both in the first and second conversion cycles) and also convert one of the voltage commands U*, V*, and W*, which is greater in absolute value of a corresponding current output next to the former one of the voltage commands U*, V*, and W*, into the B-phase voltage command (i.e., −1 or +1 only in the first conversion cycle), thereby causing the IGBTs 1 to 6 of the inverter main circuit 7 to be held on or off within the high level range where the current outputs of the respective phases are in high level and allowing the IGBTs 1 to 6 to be switched on and off as many times as possible within the low level range where the current outputs are in low level. This results in a greatly decreased switching loss in the IGBTs 1 to 6.

The command converter 21 is designed to change ones of the voltage commands U*, V*, and W* to be selected as the A-phase voltage command and the B-phase voltage command as a function of the phase shift $\alpha$, i.e., the voltage-to-current phase difference $\theta$VI. The command converter 21 may, therefore, determine the time of such selection easily by monitoring the levels of the voltage commands U*, V*, and W* outputted from the command generator 10.

FIGS. 9 to 11 show flowcharts of sub-programs to be performed by the command converter 21 according to the second embodiment of the invention in order to avoid undesirable distortion of current outputs from the inverter main circuit 7 arising from the conversion of the voltage commands U*, V*, and W* in the command converter 21. The same reference numbers as employed in the first embodiment will refer to the same parts, and explanation thereof in detail will be omitted here.

Steps in FIG. 9 are carried out instead of steps D16 to D18 in FIG. 4. If a YES answer is obtained in step D2 of FIG. 3, the routine proceeds to step E1 wherein the voltage commands U, V, and W identical with those in step D17 of FIG. 4 are defined directly as U1, V1, and W1, respectively, and the voltage commands U, V, and W identical with those in step D18 are defined directly as U2, V2, and W2, respectively.

The routine proceeds to step E2 wherein the voltage command W2 is greater than one (1) or not. If a NO answer is obtained (W2≦1), then the routine proceeds to steps E3 to E5 which are identical in operation with steps D16 to D18 of FIG. 4, and explanation thereof in detail will be omitted here.

Alternatively, if a YES answer is obtained in step E2 (W2>1), it means that the voltage command W* has been converted into an excessively higher value (i.e., W2) due to the phase shift a, which will result in undesirable distortion of waveform of the current output from the inverter main circuit 7. The voltage command W2 is provided to have a level required to apply twice the voltage between the W- and V-windings of the AC motor 9, as determined by the voltage commands W* and V*, for compensating for a loss of the voltage caused by a stop of the switching operation in the inverter main circuit 7 and, thus, sensitive to the above unwanted conversion. In order to avoid this problem, the routine proceeds to step E6 wherein the voltage commands W1 and W2 are corrected as

W1=2(W*−V*)−3
W2=1

Note that U1, U2, V1, and V2 remain unchanged.

The routine proceeds to step E7 wherein it is determined whether the clock signal ck1 is one (1) or not. If a YES answer is obtained (ck1=1), then the routine proceeds to step E8 wherein the voltage commands U1, V1, and W1 are defined as the voltage commands U, V, and W. Alternatively, if a NO answer is obtained, then the routine proceeds to step E9 wherein the voltage commands U2, V2, and W2** are defined as the voltage commands U * *, V, and W. After step E8 or E9, the routine proceeds to step D15 of FIG. 3.

Specifically, one (1) has already been subtracted from the voltage command W2 in step E1, but the voltage command W2 has been converted into an undesirable higher value exceeding the upper limit (i.e., +1) of the amplitude range of the voltage command W* (i.e., 2=±1). Thus, the voltage command W2 is set to +1 that is reversed in polarity or sign to the voltage command W1 set to a minimum value of −1 in step E1, while an excess of the amplitude of the voltage command W2 that is derived by further subtracting the amplitude range, that is, two (2) from the voltage command W2 (i.e., 2(W*−V*)−3) is given to the voltage command W1. Step E7, thus, checks the level of the clock signal sk1.

Steps in FIG. 10 are carried out instead of steps D22 to D24 of FIG. 4 for eliminating the distortion of waveform of the V-phase current output from the inverter main circuit 7 caused by an excess of the voltage command V** over an amplitude range of the voltage command V*. If a YES answer is obtained in step D4 of FIG. 3, the routine proceeds to step E10 wherein the voltage commands U , V, and W identical with those in step D23 of FIG. 4 are defined directly as U1, V1, and W1, respectively, and the voltage commands U, V, and W identical with those in step D24 are defined directly as U2, V2, and W2, respectively.

The routine proceeds to step E11 wherein the voltage command V2 is smaller than minus one (−1) or not. If a NO answer is obtained (V2≧−1), then the routine proceeds to steps E12, E13, and E14 which are identical with steps D22 to D24 of FIG. 4.

Alternatively, if a YES answer is obtained in step E11 (V2<−1) meaning that the voltage command W* has been converted into an excessively lower value (i.e., V2) due to the phase shift α, then the routine proceeds to step E15 wherein the voltage commands V1 and V2 are corrected as

V1=2(V*−U*)+3
V2=−1

The routine proceeds to step E16 wherein it is determined whether the clock signal ck2 is one (1) or not. If a YES answer is obtained (ck2=1), then the routine proceeds to step E17 wherein the voltage commands U1, V1, and W1 are defined as the voltage commands U, V, and W. Alternatively, if a NO answer is obtained, then the routine proceeds to step E18 wherein the voltage commands U2, V2, and W2 are defined as the voltage commands U, V, and W. After step E17 or E18, the routine proceeds to step D15 of FIG. 3.

Specifically, one (1) has already been added to the voltage command V2 in step E10, but the voltage command V2 has been converted into an undesirable lower value smaller than a lower limit (i.e., −1) of the amplitude range of the voltage command V* (i.e., 2=±1). Thus, the voltage command V2 is set to −1 that is reversed in polarity or sign to the voltage command V1 set to a maximum value of +1 in step E10, while an excess of the amplitude of the voltage command V2 that is derived by further adding the amplitude range, that is, two (2) to the voltage command V2 (i.e., 2(V*−U*)+3) is given to the voltage command V1. Step E16, thus, checks the level of the clock signal ck2.

Steps in FIG. 11 are carried out instead of steps D28 to D30 of FIG. 5 for eliminating the distortion of waveform of the U-phase current output from the inverter main circuit 7 caused by an excess of the voltage command U** over an amplitude range of the voltage command U*. If a YES answer is obtained in step D6 of FIG. 3, the routine proceeds to step E18 wherein the voltage commands U, V, and W identical with those in step D29 of FIG. 5 are defined directly as U1, V1, and W1, respectively, and the voltage commands U, V, and W identical with those in step D30 are defined directly as U2, V2, and W2, respectively.

The routine proceeds to step E19 wherein the voltage command U2 is greater than one (+1) or not. If a NO answer is obtained (U2≦1), then the routine proceeds to steps E20, E21, and E22 which are identical with steps D28 to D30 of FIG. 5.

Alternatively, if a YES answer is obtained in step E19 (U2>1) meaning that the voltage command U* has been converted into an excessively higher value (i.e., U2) due to the phase shift α, then the routine proceeds to step E23 wherein the voltage commands U1 and U2 are corrected as

U1=2(U*−W*)−3
U2=1

The routine proceeds to step E24 wherein it is determined whether the clock signal ck1 is one (1) or not. If a YES answer is obtained (ck1=1), then the routine proceeds to step E25 wherein the voltage commands U1, V1, and W1 are defined as the voltage commands U, V, and W. Alternatively, if a NO answer is obtained, then the routine proceeds to step E26 wherein the voltage commands U2, V2, and W2 are defined as the voltage commands U, V, and W. After step E25 or E26, the routine proceeds to step D15 of FIG. 3.

Specifically, if the voltage command U2 as determined in step E18 exceeds, as shown in FIG. 12(b), one (1) that is the upper limit of the amplitude range of the voltage command U*, and a YES answer is obtained in step E19, the amplitude of the voltage command U* is, as shown in FIG. 12(c), changed cyclically to the voltage command U1 in step E25, and the voltage command U2 in step E26. The voltage command U1 is provided in the second conversion cycle, while the voltage command U2 is provided in the first conversion cycle. The voltage command U** within the amplitude range of the voltage command U* is, thus, outputted from the command converter 21.

Figure 3:
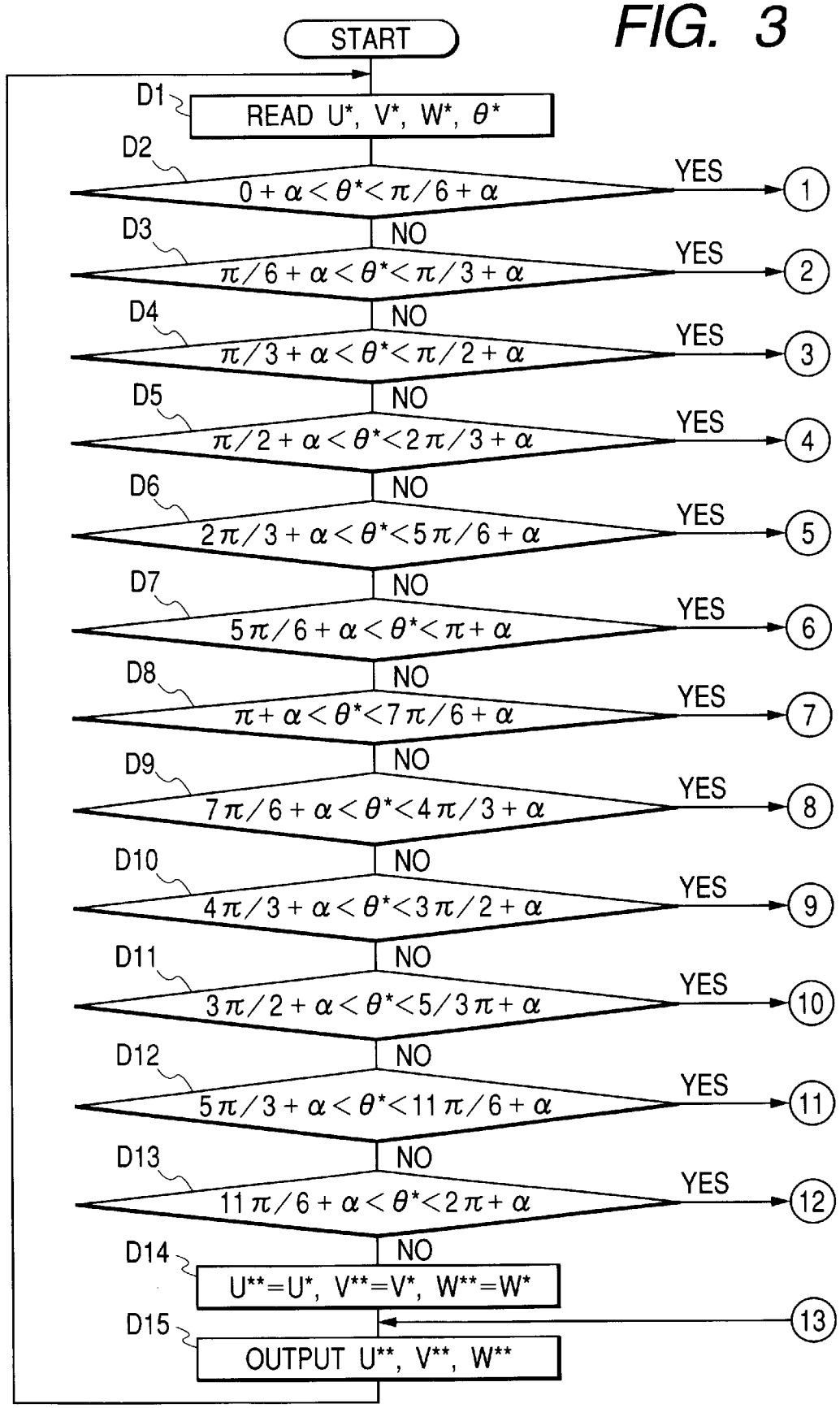

The sub-programs, as shown in FIGS. 9, 10, and 11 have been discussed, as an example, as being executed following steps D2, D4, and D6 of FIG. 3, respectively, but however, the operation in the second embodiment is, in practice, performed following each of steps D2 to D13 to monitor whether one of the voltage commands U*, V*, and W* converted into a voltage that is twice a voltage difference between the other two of the voltage commands U*, V*, and W* has exceeded the amplitude range of the voltage commands U*, V*, and W* or not, and, if so, correct it in the manner as described above.

As apparent from the above discussion, if the voltage commands U2, V2, and W2 to which the voltage commands U*, V*, and W* which are converted into 1 or −1 in the first conversion cycle, but not in the second conversion cycle (i.e., the B-phase voltage commands) are converted in the second conversion cycle, respectively, exceed the amplitude range of the maximum to minimum level, the voltage commands U2, V2, and W2 in the first conversion cycle are reversed in polarity or sign, and each of the voltage commands U1, V1, and W1 in the second conversion cycle are corrected to an excess of a corresponding one of the voltage commands U2, V2, and W2 over the amplitude range, thereby eliminating the distortion of the waveform of current outputs form the inverter main circuit 7 as well as reducing a switching loss of the IGBTs 1 to 6.

The second embodiment may be used in the system as taught in Japanese Patent Application No. 11-369662 (U.S. Pat. No. 6,324,085 B2 assigned to the same assignee as that of this application), disclosure of which is incorporated herein by reference.

The decision in each of the steps D2 to D13 of FIG. 3 is made as a function of the reference phase θ*, but may alternatively be made by comparing between levels of the voltage commands U*, V*, and W*.

The cycle sections in steps D2 to D13 of FIG. 3 is changed as a function of the phase shift α (i.e., the voltage-to-current phase difference θVI), but may alternatively be changed by directly monitoring levels of the U-phase, V-phase, and W-phase current outputs from the inverter main circuit 7.

The inverter of the invention uses the PWM established by comparison between the triangular carrier wave and the voltage commands U, V, and W**, but may use another system designed to convert the power by changing the width of pulses through switching operations.

Instead of the IGBTs 1 to 6, power transistors or MOS-FETs may be employed.

The phase θ of the rotor of the AC motor 9 may be measured by a rotary encoder, a resolver, or a so-called sensor-less system designed to measure the voltage induced by the motor 9 using a voltage divider or a comparator to determine the angular position of the rotor of the motor 9.

The command converter 21 may be implemented by a CPU along with the command generator 10 and the PWM-waveform generator 11.

The inverter of the invention may be employed in driving a polyphase AC motor having more than three phase windings.

The inverter of the invention may be installed in electric vehicles, hybrid vehicles, or a UPS (uninterruptible power supply) working to output polyphase winding voltages.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A power inverter outputting power to a polyphase load comprising:

an inverter main circuit working to apply phase voltages to the polyphase load through switching elements;

a voltage command outputting circuit outputting first voltage commands for respective phases, each of the first voltage commands varying between a maximum and a minimum level;

a voltage command converter converting the first voltage commands outputted by said voltage command outputting circuit into second voltage commands in a first and a second conversion cycle which are provided alternately, said voltage command converter converting two of the first voltage commands into the second voltage commands that are equal to one of the maximum and minimum levels in the first conversion cycle and also converting one of the two of the first voltage commands into the second voltage command that is equal to one of the maximum and minimum levels in the second conversion cycle, if the one of the first voltage commands as being converted into the second voltage command that is equal to the one of the maximum and minimum levels both in the first and second conversion cycles is defined as an A-phase voltage command, the A-phase voltage command being selected as one of two of the first voltage commands showing the maximum and minimum levels within the first and second conversion cycles which is greater in absolute value of a corresponding current outputted to the polyphase load, if the other of the two of the first voltage commands as being converted into the second voltage commands that is equal to the one of the maximum and minimum level only in the first conversion cycle is defined as a B-phase voltage command, the B-phase voltage command being selected as one of the first voltage commands which is greater in absolute value of a corresponding current outputted to the polyphase load next to the A-phase voltage command; and a switching control signal outputting circuit working to pulse-width modulate a carrier wave as functions of the respective second voltage commands to output switching control signals for the respective phases to control switching operations of the switching elements of said inverter main circuit.

2. A power inverter as set forth in claim 1, wherein said voltage command converter determines one of the first voltage commands selected as each of the A-phase voltage command and the B-phase voltage command as a function of a phase difference between the first voltage command and the current outputted to the polyphase load.

3. A power inverter as set forth in claim 1, wherein when one of the second voltage commands into which the B-phase voltage command is converted in the second conversion cycle lies out of a range of the maximum level to the minimum level, one of the second voltage commands into which the B-phase voltage command is converted in the first conversion cycle being corrected to a value reversed in polarity, the second voltage command into which the B-phase voltage command is converted in the second conversion cycle being corrected to a value that is equal to an excess of the second voltage command over the range of the maximum to minimum level.

4. A power inverter as set forth in claim 1, wherein the number of phases of the polyphase load is three.

5. A power inverter as set forth in claim 1, wherein the polyphase load is an AC motor.

6. A power inverter outputting power to a polyphase load comprising:
- an inverter main circuit working to apply phase voltages to the polyphase load through switching elements;
- a voltage command outputting circuit outputting first voltage commands for respective phases, each of the first voltage commands varying between a maximum and a minimum level;
- a voltage command converter converting the first voltage commands outputted by said voltage command outputting circuit into second voltage commands in a first and a second conversion cycle which are provided alternately, said voltage command converter converting two of the first voltage commands into the second voltage commands that are identical with one of the maximum and minimum levels in the first conversion cycle and also converting one of the two of the first voltage commands into the second voltage command that is identical with one of the maximum and minimum levels in the second conversion cycle, assuming that one of the two of the first voltage commands which is converted into the second voltage command that is equal to the one of the maximum and minimum levels only in the first conversion cycle is defined as a third voltage command, when the second voltage command into which the third voltage command is converted in the second conversion cycle lies out of a range of the maximum level to the minimum level, the second voltage command into which the third voltage command being converted in the first conversion cycle being corrected to a value reversed in polarity, the second voltage command into which the third voltage command being converted in the second conversion cycle being corrected to a value that is equal to an excess of the second voltage command over the range of the maximum to minimum level; and
- a switching control signal outputting circuit working to pulse-width modulate a carrier wave as functions of the respective second voltage commands to output switching control signals for the respective phases to control switching operations of the switching elements of said inverter main circuit.

7. A power inverter as set forth in claim 6, wherein if the other of the two of the first voltage commands as being converted into the second voltage commands that is equal to the one of the maximum and minimum level both in the first conversion cycle and the second conversion cycle is defined as a fourth voltage command, said voltage command converter changes one of the first voltage commands selected as each of the third voltage command and the fourth voltage command as a function of a given parameter.

8. A power inverter as set forth in claim 6, wherein the number of phases of the polyphase load is three.

9. A power inverter as set forth in claim 6, wherein the polyphase load is an AC motor.

10. A method of outputting power to a polyphase load from an inverter main circuit comprising the steps of:
- outputting first voltage commands for respective phases each of which varies between a maximum and a minimum level;
- converting the first voltage commands outputted by said voltage command outputting circuit into second voltage commands in a first and a second conversion cycle which are provided alternately, in the first conversion cycle, two of the first voltage commands being converted into the second voltage commands that are equal to one of the maximum and minimum levels, in the second conversion cycle, one of the two of the first voltage commands being converted into the second voltage command that is equal to one of the maximum and minimum levels, if the one of the first voltage commands as being converted into the second voltage command that is equal to the one of the maximum and minimum levels both in the first and second conversion cycles is defined as an A-phase voltage command, the A-phase voltage command being selected as one of two of the first voltage commands showing the maximum and minimum levels within the first and second conversion cycles which is greater in absolute value of a corresponding current outputted to the polyphase load, if the other of the two of the first voltage commands as being converted into the second voltage commands that is equal to the one of the maximum and minimum level only in the first conversion cycle is defined as a B-phase voltage command, the B-phase voltage command being selected as one of the first voltage commands which is greater in absolute value of a corresponding current outputted to the polyphase load next to the A-phase voltage command; and
- pulse-width modulating a carrier wave as functions of the respective second voltage commands to output switching control signals for the respective phases to control switching operations of switching elements of the inverter main circuit for driving the polyphse load.

11. A method as set forth in claim 10, wherein one of the first voltage commands selected as each of the A-phase voltage command and the B-phase voltage command being determined as a function of a phase difference between the first voltage command and the current outputted to the polyphase load.

12. A method as set forth in claim 10, wherein when one of the second voltage commands into which the B-phase voltage command is converted in the second conversion cycle lies out of a range of the maximum level to the minimum level, one of the second voltage commands into which the B-phase voltage command is converted in the first conversion cycle being corrected to a value reversed in polarity, the second voltage command into which the B-phase voltage command is converted in the second conversion cycle being corrected to a value that is equal to an excess of the second voltage command over the range of the maximum to minimum level.

13. A method as set forth in claim 10, wherein the number of phases of the polyphase load is three.

14. A method as set forth in claim 10, wherein the polyphase load is an AC motor.

15. A method of outputting power to a polyphase load from an inverter main circuit comprising the steps of:

outputting first voltage commands for respective phases each of which varies between a maximum and a minimum level;

converting the first voltage commands outputted by said voltage command outputting circuit into second voltage commands in a first and a second conversion cycle which are provided alternately, in the first conversion cycle, two of the first voltage commands being converted into the second voltage commands that are identical with one of the maximum and minimum levels, in the second conversion cycle, one of the two of the first voltage commands being converted into the second voltage command that is identical with one of the maximum and minimum levels, assuming that one of the two of the first voltage commands which is converted into the second voltage command that is equal to the one of the maximum and minimum levels only in the first conversion cycle is defined as a third voltage command, when the second voltage command into which the third voltage command is converted in the second conversion cycle lies out of a range of the maximum level to the minimum level, the second voltage command into which the third voltage command being converted in the first conversion cycle being corrected to a value reversed in polarity, the second voltage command into which the third voltage command being converted in the second conversion cycle being corrected to a value that is equal to an excess of the second voltage command over the range of the maximum to minimum level; and pulse-width modulating a carrier wave as functions of the respective second voltage commands to output switching control signals for the respective phases to control switching operations of switching elements of said inverter main circuit for driving the polyphase load.

16. A method as set forth in claim 15, wherein if the other of the two of the first voltage commands as being converted into the second voltage commands that is equal to the one of the maximum and minimum level both in the first conversion cycle and the second conversion cycle is defined as a fourth voltage command, one of the first voltage commands selected as each of the third voltage command and the fourth voltage command being changed as a function of a given parameter.

17. A method as set forth in claim 15, wherein the number of phases of the polyphase load is three.

18. A method as set forth in claim 15, wherein the polyphase load is an AC motor.

* * * * *